US011723044B2

(12) United States Patent
Kwak et al.

(10) Patent No.: US 11,723,044 B2
(45) Date of Patent: Aug. 8, 2023

(54) CONTROL RESOURCE SET WITH LARGER ALLOCATION IN THE TIME DOMAIN FOR REDUCED BANDWIDTH DEVICES

(71) Applicant: QUALCOMM Incorporated, San Diego, CA (US)

(72) Inventors: Yongjun Kwak, San Diego, CA (US); Hung Dinh Ly, San Diego, CA (US); Jing Lei, San Diego, CA (US); Huilin Xu, Temecula, CA (US); Yuchul Kim, San Diego, CA (US); Hwan Joon Kwon, San Diego, CA (US); Juan Montojo, San Diego, CA (US); Peter Gaal, San Diego, CA (US)

(73) Assignee: QUALCOMM INCORPORATED

( * ) Notice: Subject to any disclaimer, the term of this patent is extended or adjusted under 35 U.S.C. 154(b) by 65 days.

(21) Appl. No.: 17/357,611

(22) Filed: Jun. 24, 2021

(65) Prior Publication Data

US 2022/0417911 A1 Dec. 29, 2022

(51) Int. Cl.
*H04W 72/10* (2009.01)
*H04L 5/00* (2006.01)
*H04W 72/23* (2023.01)
*H04W 72/044* (2023.01)

(52) U.S. Cl.
CPC ........... *H04W 72/23* (2023.01); *H04L 5/0048* (2013.01); *H04W 72/044* (2013.01)

(58) Field of Classification Search
CPC .................. H04W 72/042; H04L 5/0048
See application file for complete search history.

(56) References Cited

U.S. PATENT DOCUMENTS

| 2019/0082427 A1* | 3/2019 | Kim ..................... H04W 72/23 |
| 2020/0053757 A1 | 2/2020 | Bagheri et al. |
| 2020/0228966 A1* | 7/2020 | Xu ....................... H04W 56/001 |
| 2020/0267697 A1* | 8/2020 | Liu ......................... H04L 5/0044 |
| 2022/0116922 A1* | 4/2022 | Cheng ................. H04L 25/0226 |

FOREIGN PATENT DOCUMENTS

| WO | WO-2021016917 A1 | 2/2021 |
| WO | WO-2021022435 A1 | 2/2021 |

OTHER PUBLICATIONS

International Search Report and Written Opinion—PCT/US2022/072848—ISA/EPO—dated Sep. 28, 2022.

* cited by examiner

*Primary Examiner* — Ronald B Abelson
(74) *Attorney, Agent, or Firm* — Norton Rose Fulbright US LLP; Kevin T. Cheatham

(57) ABSTRACT

This disclosure provides systems, methods, and devices for wireless communication that support reduced bandwidth devices and particularly, allocation of more than three orthogonal frequency division multiplexing (OFDM) symbols in the time domain to a control resource set (CORESET). In a first aspect, a method for wireless communication includes receiving, from a base station at a user equipment (UE), a first message that indicates a CORESET configuration. The CORESET configuration allocates more than three OFDM symbols in the time domain to a CORESET. The method further includes monitoring a set of time and frequency resources to receive a second message from the base station at the UE. The set of time and frequency resources have the CORESET configuration. Other aspects and features are also claimed and described.

22 Claims, 12 Drawing Sheets

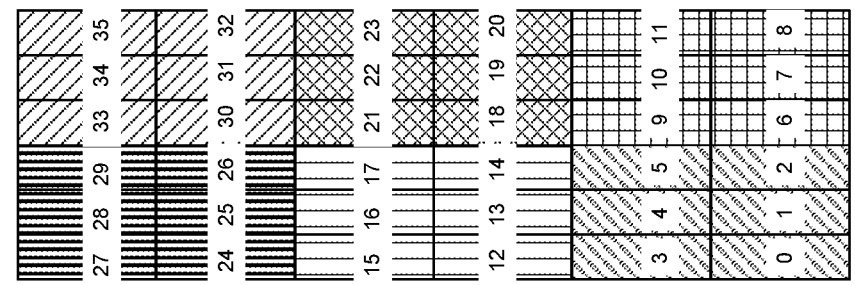
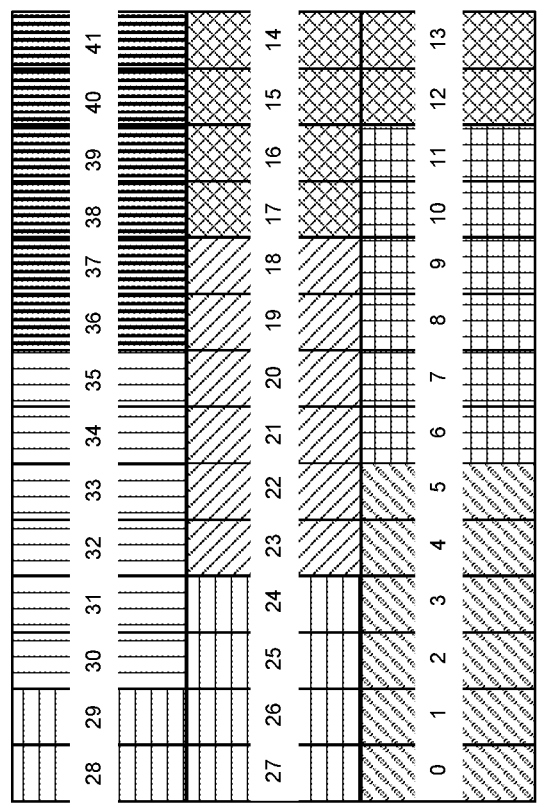
6-symbol CORESET
*FIG. 7B*
14-symbol CORESET
*FIG. 7A*
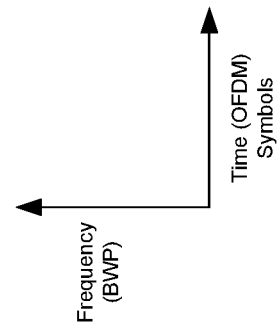

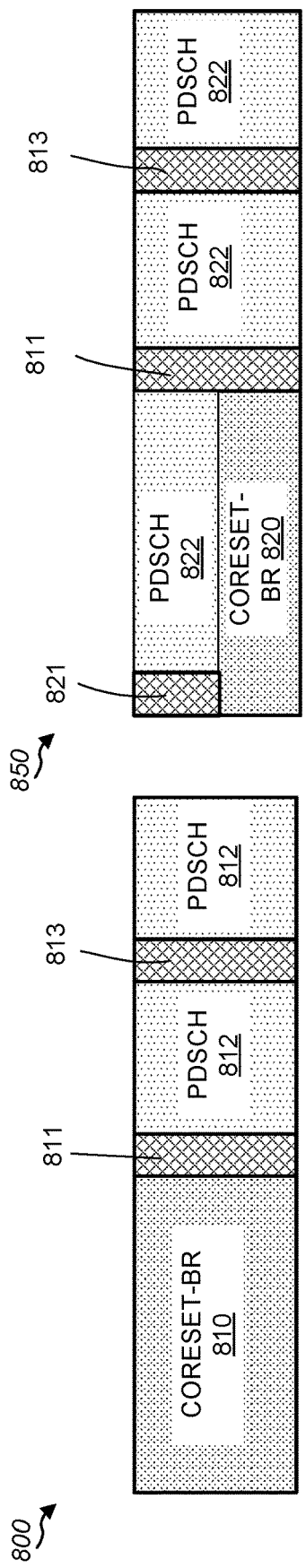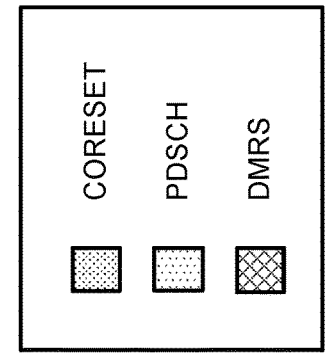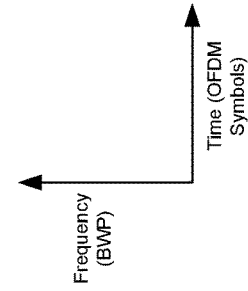
FIG. 8B
FIG. 8A

CONTROL RESOURCE SET WITH LARGER ALLOCATION IN THE TIME DOMAIN FOR REDUCED BANDWIDTH DEVICES

TECHNICAL FIELD

Aspects of the present disclosure relate generally to wireless communication systems, and more particularly, to systems that support reduced bandwidth devices, such as devices that support 20 megahertz (20 MHz) or less bandwidth. Some features may enable and provide improved communications, including allocation of more than three orthogonal frequency division multiplexing (OFDM) symbols in the time domain to a control resource set (CORESET) for reduced bandwidth operation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

5th generation new radio (5G-NR) wireless communication provide improved quality communications and enhanced features through the use of higher bandwidths, such as the "millimeter wave" bandwidth. Although such improvements have been implemented in smartphones and other devices, some of the benefits of the technology have not been extended to less complex devices. To illustrate, research into supporting 5G-NR concepts in "reduced capabilities" (RedCap) devices, "NR-light" devices, and "NR-superlight" devices is progressing. Such research focuses on relaxing peak throughput, latency, and reliability requirements associated with typical 5G-NR to extend the benefits to devices with less complex processors and smaller battery lifetimes, such as wireless sensors, metering devices, asset tracking devices, and personal Internet-of-Things (IoT) devices, as non-limiting examples. Research goals include supporting low power wide area (LPWA) networks and devices via improvements in coverage, complexity, and power consumption, in addition to utilization of low-power and low-complexity sidelink communications. One focus of NR-superlight device research is to support devices that communicate via reduced bandwidths, such as bandwidths of 20 megahertz (MHz) or less. However, such reduced bandwidth operation may cause problems when attempting to support 5G-NR functionality, which is designed for larger bandwidth operation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving, from a base station at a user equipment (UE), a first message that indicates a control resource set (CORESET) configuration. The CORESET configuration allocates more than three orthogonal frequency division multiplexing (OFDM) symbols in the time domain to a CORESET. The method also includes monitoring a set of time and frequency resources to receive a second message from the base station at the UE. The set of time and frequency resources have the CORESET configuration.

In an additional aspect of the disclosure, an apparatus includes at least one processor and a memory coupled to the at least one processor. The at least one processor is configured to receive, from a base station, a first message that indicates a CORESET configuration. The CORESET configuration allocates more than three OFDM symbols in the time domain to a CORESET. The at least one processor is also configured to monitor a set of time and frequency resources to receive a second message from the base station. The set of time and frequency resources have the CORESET configuration.

In an additional aspect of the disclosure, an apparatus includes means for receiving, from a base station, a first message that indicates a CORESET configuration. The CORESET configuration allocates more than three OFDM symbols in the time domain to a CORESET. The apparatus also includes means for monitoring a set of time and frequency resources to receive a second message from the base station. The set of time and frequency resources have the CORESET configuration.

In an additional aspect of the disclosure, a non-transitory computer-readable medium stores instructions that, when executed by a processor, cause the processor to perform operations. The operations include receiving, from a base station at a UE, a first message that indicates a CORESET configuration. The CORESET configuration allocates more than three OFDM symbols in the time domain to a CORESET. The operations also include monitoring a set of time and frequency resources to receive a second message from the base station at the UE. The set of time and frequency resources have the CORESET configuration.

In an additional aspect of the disclosure, a method for wireless communication includes generating, at a base station, a first message that indicates a CORESET configuration. The CORESET configuration allocates more than three OFDM symbols in the time domain to a CORESET. The method also includes transmitting, to a UE, the first message.

In an additional aspect of the disclosure, an apparatus includes at least one processor and a memory coupled to the at least one processor. The at least one processor is configured to generate a first message that indicates a CORESET configuration. The CORESET configuration allocates more than three OFDM symbols in the time domain to a CORESET. The at least one processor is also configured to initiate transmission, to a UE, of the first message.

In an additional aspect of the disclosure, an apparatus includes means for generating a first message that indicates a CORESET configuration. The CORESET configuration allocates more than three OFDM symbols in the time domain to a CORESET. The apparatus also includes means for transmitting, to a UE, the first message.

In an additional aspect of the disclosure, a non-transitory computer-readable medium stores instructions that, when executed by a processor, cause the processor to perform operations. The operations include generating, at a base station, a first message that indicates a CORESET configuration. The CORESET configuration allocates more than three OFDM symbols in the time domain to a CORESET. The operations also include initiating transmission, to a UE, of the first message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7A illustrates a first example of REG indexing and REG to CCE assignment according to one or more aspects.

FIG. 7B illustrates a second example of REG indexing and REG to CCE assignment according to one or more aspects.

FIG. 8A illustrates a first example of CORESET, PDSCH, and demodulation reference signal (DMRS) allocation according to one or more aspects.

FIG. 8B illustrates a second example of CORESET, PDSCH, and DMRS allocation according to one or more aspects.

Like reference numbers and designations in the various drawings indicate like elements.

DETAILED DESCRIPTION

Figure 1:
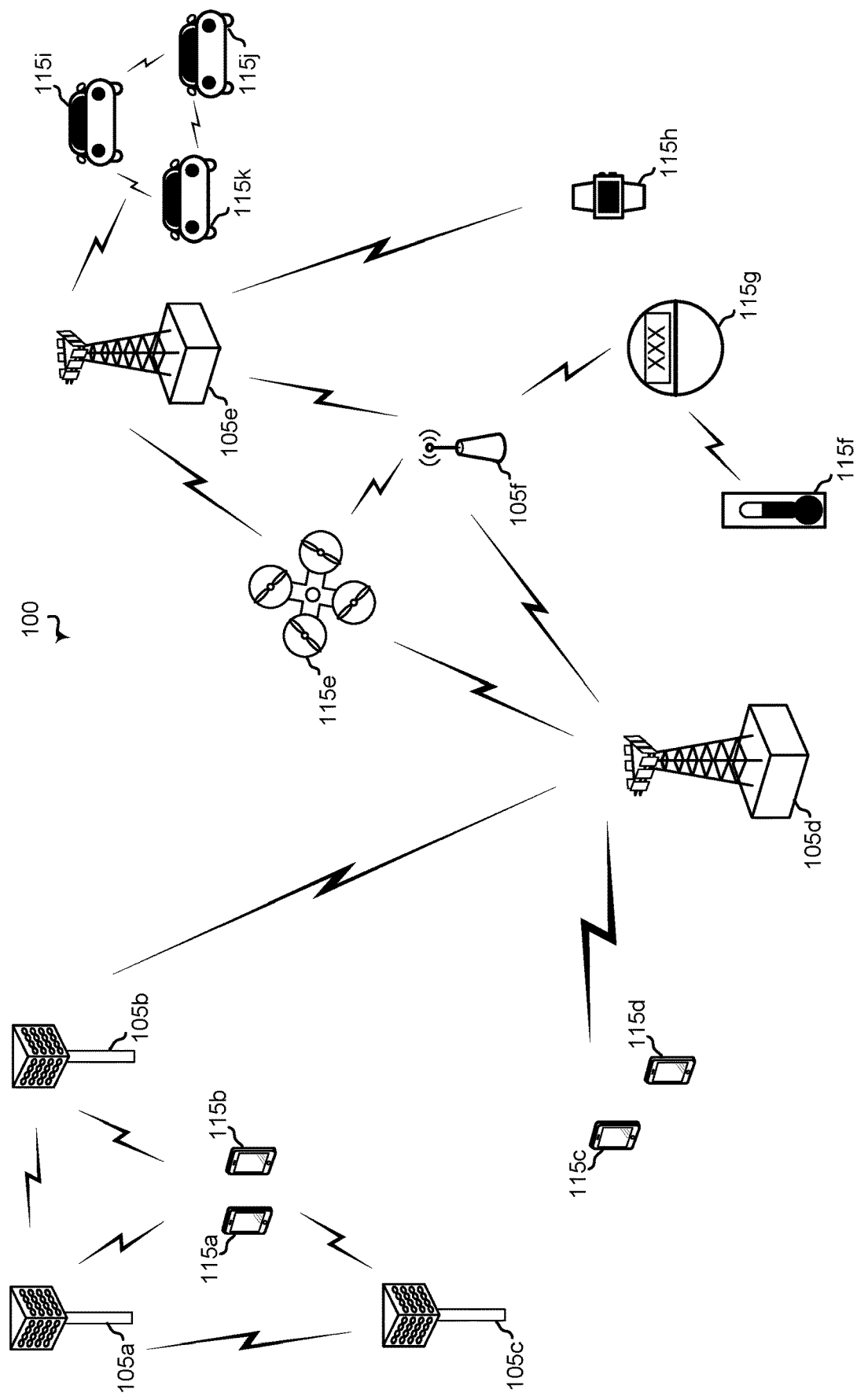
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support reduced bandwidth devices, such as devices that communicate via bandwidths of 20 megahertz (MHz) or less, particularly 5 MHz or less, in 5th generation new radio (5G-NR) wireless networks. In particular, the techniques described herein support control resource sets (CORESETs) having a larger dimension in the time domain and a smaller dimension in the frequency domain for use by reduced bandwidth devices. For example, a CORESET described herein may be allocated more than three orthogonal frequency division multiplexing (OFDM) symbols in the time domain and bandwidth of 5 MHz or less in the frequency domain. Wireless communication devices configured for 5 MHz or less operations, referred to herein as "superlight" or "NR-superlight" devices, may support physical broadcast channel (PBCH) resource allocations used by typical, non-reduced bandwidth devices, but may not support CORESET resource allocations used by such devices due to the CORESET being allocated to a larger bandwidth than a maximum operating bandwidth of the superlight devices. Thus, a CORESET that is designated for other devices and is configured by master information block (MIB) sent within a physical broadcast channel (PBCH) may not be usable by superlight devices. Instead, the superlight devices may be configured to receive a separate message that indicates a different CORESET configuration that can be used by superlight devices, or the CORESET configuration may be determined based on pre-configured information stored at the superlight devices and based on one or more communication parameters, which may be determined by the superlight devices or indicated by the PBCH. This CORESET configuration allocates a larger dimension in the time domain (e.g., more than three OFDM symbols, such as four to fourteen OFDM symbols) and a smaller dimension in the frequency domain (e.g., 5 MHz or less) to the CORESET for superlight devices. In some implementations, additional parameters, such as physical downlink shared channel (PDSCH) mapping, demodulation reference signal (DMRS) positioning for PDSCHs, resource element group (REG) indexing, and control channel element (CCE)-REG mapping may be configured for the CORESET for superlight devices.

To illustrate operation of a superlight device, a user equipment (UE) configured for 5 MHz or less operations (or 20 MHz or less as another example) may receive a message from a base station. The message may indicate a CORESET configuration which allocates more than three OFDM symbols in the time domain and bandwidth of 5 MHz or less in the frequency domain to a CORESET for the UE. The UE may then monitor a set of time and frequency resources allocated to the CORESET (e.g., the search space allocated by the CORESET configuration) to receive a second message from the base station. The second message may include downlink control information (DCI) that is transmitted from the base station in a physical downlink control channel (PDCCH) within the time and frequency resources allocated to the CORESET. The second message may indicate a resource allocation for a PDSCH that is to include additional downlink data from the base station.

Particular implementations of the subject matter described in this disclosure may be implemented to realize one or more of the following potential advantages or benefits. In some aspects, the present disclosure provides techniques for allocating time and frequency resources to CORESETs for wireless communication devices that support reduced bandwidth operation. For example, instead of using a CORESET configuration (e.g., an allocation of time and frequency resources) used by other types of devices (e.g., non-reduced band devices), reduced bandwidth devices, such as a reduced bandwidth UE, may receive a message indicating a CORESET configuration for reduced bandwidth devices. For example, the CORESET configuration may indicate an allocation of fewer frequency resources (e.g., less than 5 MHz bandwidth) and more time resources (e.g., more than 3 OFDM symbols) to a CORESET for reduced bandwidth devices as compared to a CORESET for other types of devices (e.g., non-superlight devices). Thus, reduced bandwidth devices may be able to receive the same amount of information in a CORESET as other types of devices, while operating at a reduced bandwidth compared to the other types of devices. Additionally, the CORESET configuration for reduced bandwidths may also include additional details about the CORESET resource allocation, such REG indexing, CCE-REG mapping, and DMRS position for PDSCH. In this manner, wireless communication devices configured for reduced bandwidth operation, such as 5 MHz or less bandwidth, may be able to establish effective communications with a 5G-NR network, which is typically designed for larger bandwidth operation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
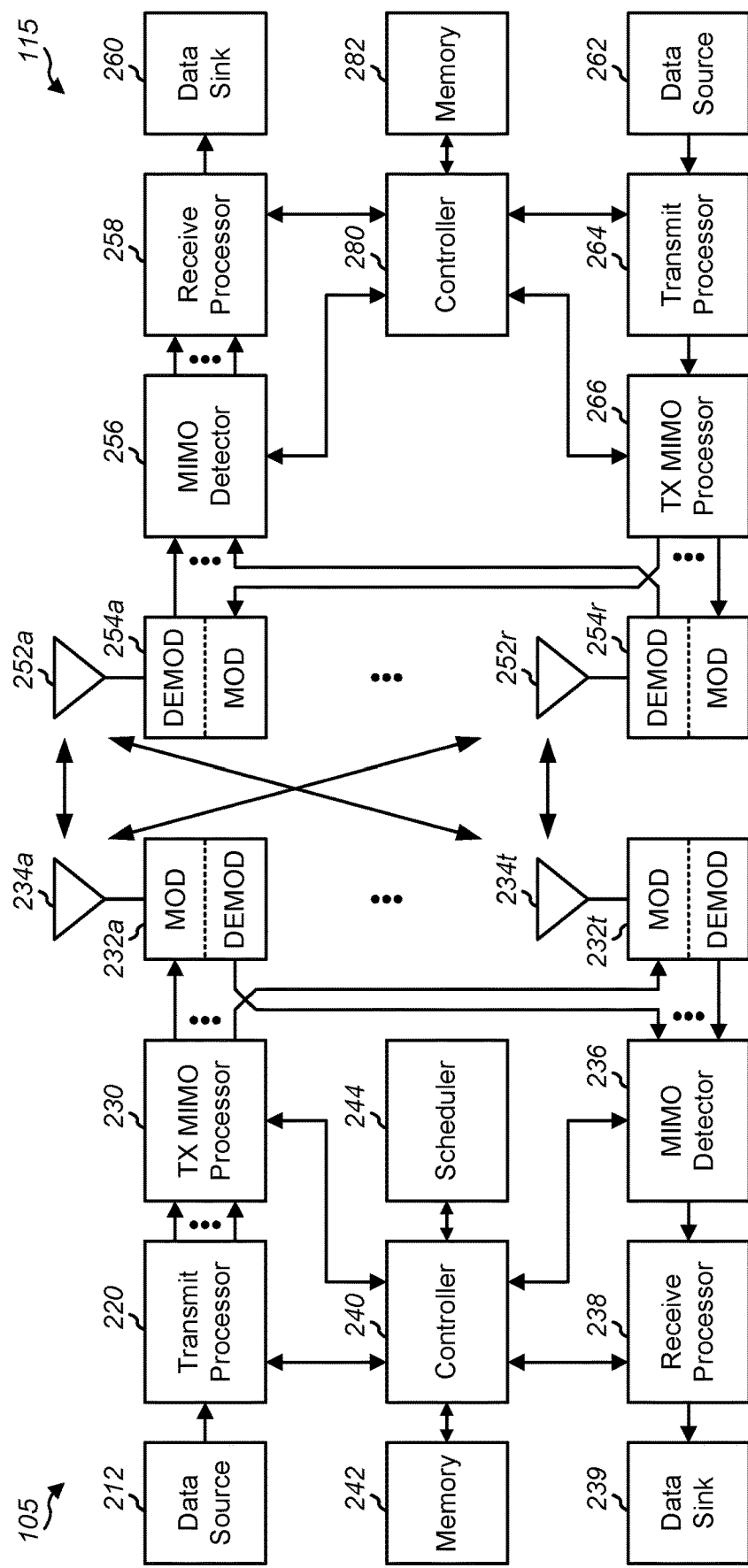
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 9 and 11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
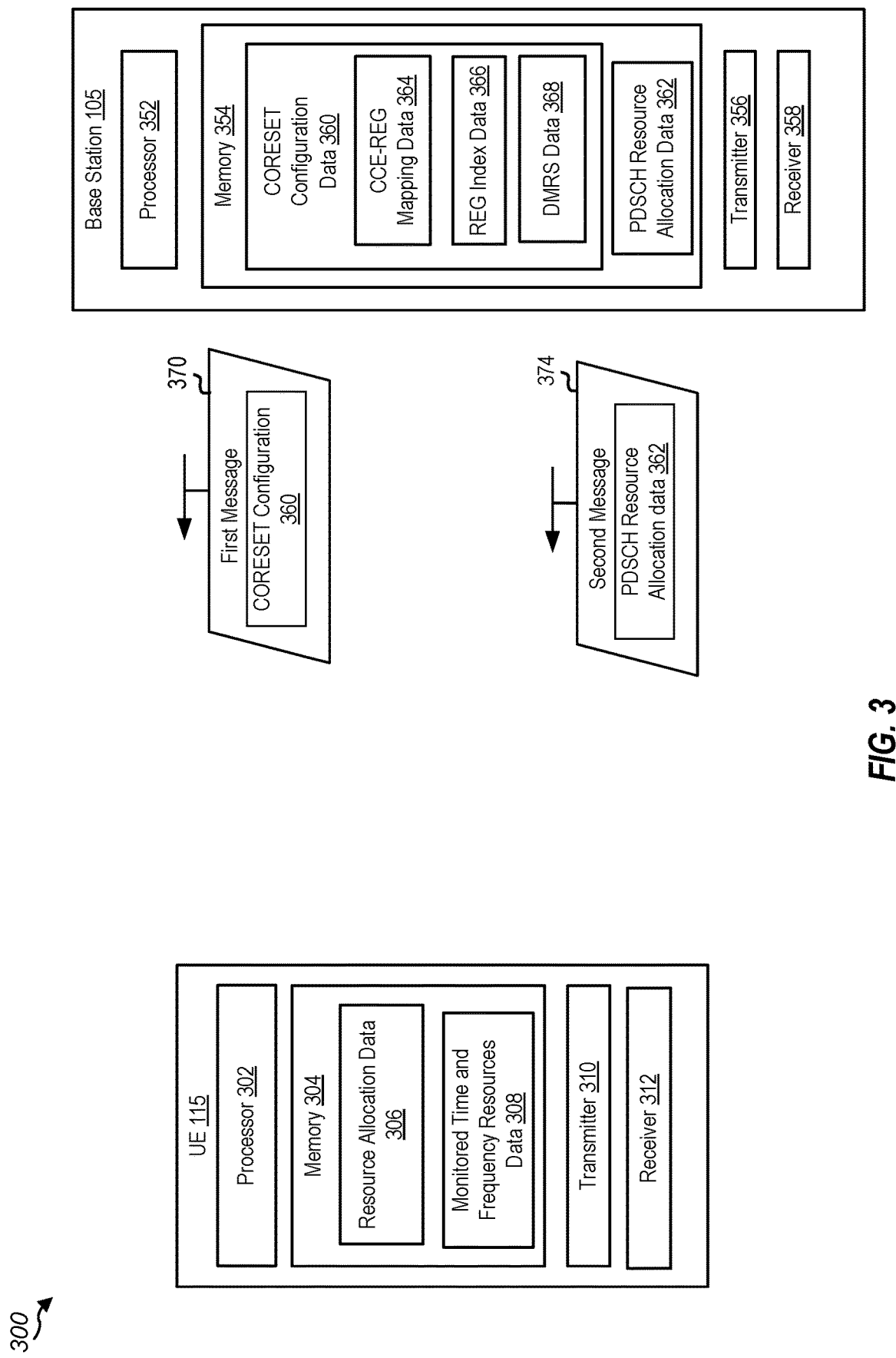
FIG. 3 is a block diagram of an example wireless communications system that supports control resource sets (CORESETs) for use by reduced bandwidth devices according to one or more aspects according to one or more aspects.

FIG. 3 is a block diagram of an example wireless communications system 300 that supports CORESETs for use by reduced bandwidth devices according to one or more aspects. The CORESETs may be allocated a larger dimension in the time domain (e.g., more than three OFDM symbols) and a smaller dimension in the frequency domain (e.g., 20 MHz or less in the frequency domain) than resource allocations to CORESETs for other devices, such as devices configured to communicate via wider channel bandwidths (e.g., greater than 20 MHz) and three or less than three OFDM symbols. The reduced bandwidth devices may also be referred to as "superlight" or "NR-superlight" devices. In some implementations, superlight devices may be configured to communicate via reduced bandwidth communications, such as 5 MHz or less bandwidths. In some other implementations, superlight devices may be configured to communicate via wider, but still reduced, bandwidths, such as 20 MHz or less, or other bandwidths. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store resource allocation data 306 and monitored time and frequency resources data 308. The resource allocation data 306 may indicate details about CORESET resource allocation for the UE 115. For example, the resource allocation data 306 may include allocated time and frequency resources to a CORESET for the UE 115. In some implementations, these allocated time and frequency resources to the CORESET may include a larger dimension in the time domain (e.g., more than three OFDM symbols) and a smaller dimension in the frequency domain (e.g., 20 MHz or less in the frequency domain) than resource allocations to a CORESET for other types of devices, such as non-superlight devices. The resource allocation data 306 may also indicate additional details about the CORESET resource allocation, such as REG bundling data, CCE-REG mapping data, REG index data, and DMRS data (e.g., DMRS position in the time domain for a CORESET). The CCE-REG mapping data may indicate mappings of CCEs to REGs for various CORESETs. The REG index data may indicate indices of REGs for various CORESETs. The DMRS data may indicate DMRS assignments for various CORESETs, as further described below. In some implementations, the resource allocation data 306 may be received by the UE 115 from another node (e.g., the base station 105) in the wireless communications system 300 and may then be stored at the memory 304. The monitored time and frequency resources data 308 may indicate a set of time and frequency resources that is monitored by the UE 115 to receive one or more messages from the base station 105, as further described herein.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store CORESET configuration data 360 and PDSCH resource allocation data 362. In some implementations, the CORESET configuration data 360 may indicate CCE-REG mapping data 364, REG index data 366, and DMRS data 368. The CCE-REG mapping data 364 may indicate a mapping of REGs to CCEs used to allocate resources to a CORESET. In some implementations, each CCE includes six REGs, and each REG corresponds to one PRB in the frequency domain and one OFDM symbol in the time domain. PRB to REG assignment may be based on a fixed dimension in the time domain, a fixed dimension in the frequency domain, or based on a continuous pattern in the frequency domain but not the time domain, as non-limiting examples. The REG index data 366 may indicate patterns for assigning indices to the REGs for various CORESETs. For example, the indices may be assigned based on a pattern for a fixed dimension in the time domain or a pattern that is continuous in the frequency domain but not the time domain. The DMRS data 368 may indicate an OFDM symbol allocated to a DMRS. In some implementations, the DMRS data 368 may indicate a relationship between the CORESET and the DMRS in the time domain. For example, the DMRS data 368 may indicate which resources of those allocated to the CORESET are designated for communication of the DMRS.

Although, the CCE-REG mapping data 364, REG index data 366, and DMRS data 368 are shown in FIG. 3 as being included in CORESET configuration data 360 stored at the base station 105 and described herein as being transmitted to the UE 115 via a first message 370, in other implementations, one or more of the CCE-REG mapping data 364, REG index data 366, and DMRS data 368, either partially or fully, may be predefined and stored at UE 115. For example, the one or more of the CCE-REG mapping data 364, REG index data 366, and DMRS data 368, either partially or fully, may be stored at the memory 304 during manufacture, setup, or deployment of the UE 115. Additionally or alternatively, the one or more of the CCE-REG mapping data 364, REG index data 366, and DMRS data 368, either partially or fully, may be received from another device, such as being included in a software or firmware update for the UE 115. In some implementations, the one or more of the CCE-REG mapping data 364, REG index data 366, and DMRS data 368 may be defined in one or more wireless communication standard specifications, such as a 3GPP standard, as a non-limiting example.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP. Additionally, the wireless communications system 300 may support reduced bandwidth (e.g., superlight) devices. For example, the UE 115 and the base station 105 may be configured to communicate via a reduced bandwidth (e.g., channel bandwidth), such as 5 MHz or less, or 20 MHz or less, as non-limiting examples, and the base station 105 may be configured to communicate with other UEs via a larger bandwidth, such as 50, 100, 200, or 400 MHz, as non-limiting examples.

During operation of wireless communications system 300, the base station 105 determines a CORESET configuration data 360 and broadcasts a first message 370 that includes the CORESET configuration data 360 to enable superlight devices searching for a cell to receive information that schedules additional messages for use to connect to the base station 105. The base station 105 may determine the CORESET configuration data 360 based on a device type of the intended receiving devices, such as whether the devices are superlight devices associated with a reduced operating bandwidth, or whether the devices are other types of devices that do not have such reduced operating bandwidths. The base station 105 may transmit the first message 370 within a physical broadcast channel (PBCH) to devices within a coverage range of the base station 105. In some implementations, the first message 370 includes a radio resource control (RRC) message, such as a master information block (MIB). The first message 370 (e.g., the MIB and the PBCH) may define a CORESET, such as CORESET0-Bandwidth Reduction (CORESET0-BR), for superlight devices. Alternatively, the first message 370 may define a CORESET0 for other device types, in addition to including some information, such as the CORESET configuration data 360, to also define CORESET0-BR for superlight devices. In some such implementations, the CORESET configuration data 360 may be selected by the UE 115 from multiple pre-stored (e.g., preconfigured or predefined) CORESET configurations based on one or more communication parameters, such as subcarrier spacing, which may be indicated by the first message 370 for superlight devices and non-superlight devices. To illustrate, if a subcarrier spacing indicated by the first message 370 has a first value, the UE 115 may select a first configuration that allocates a first number of OFDM symbols as the CORESET configuration data 360, and if the subcarrier spacing has a second value, the UE 115 may select a second configuration that allocates a second number of OFDM symbols as the CORESET configuration data 360.

The UE 115 may receive the first message 370 including the CORESET configuration data 360 and may store the CORESET configuration data 360 at the memory 304. The UE 115 may be configured to receive and process the first message 370 and to extract the CORESET configuration data 360 based on the UE 115 being configured as a superlight device, such as being configured to communicate with the base station 105 via a bandwidth or bandwidth part (BWP) that is less than 5 MHz. In some implementations, the CORESET configuration data 360 is stored as the resource allocation data 306 at the memory 304. The CORESET configuration data 360 allocates fewer resources in the frequency domain and more resources in the time domain to CORESET0-BR than an allocation of time and frequency resources to CORESET0 for other devices. For example, the CORESET configuration data 360 may allocate between 4 and 14 OFDM symbols in the time domain to the CORESET for UE 115. Although described herein as allocating references to an initial CORESET for superlight devices (e.g., CORESET0-BR), in other implementations, the CORESET configuration data 360 may allocate resources to a different CORESET for superlight devices. The CORESET configuration data 360 defines a set of time and frequency resources at which additional communication from the base station 105 to the UE 115 is scheduled to occur. As an illustrative, non-limiting example, the CORESET configuration data 360 may define a set of time and frequency resources at which the base station 105 transmits a message, such as a second message 374 to the UE 115.

In addition to defining the time and frequency resources allocated to CORESET0-BR (e.g., the CORESET for the superlight devices), the CORESET configuration data 360 may indicate other communication parameters. As an example, the CORESET configuration data 360 may define a subcarrier spacing (SCS) value for the UE 115. SCS represents the difference in frequency between subcarriers in PRBs, and SCS can have one of multiple values in 5G NR systems. The UE 115 may be configured to perform all communications according to a single SCS value, or the UE 115 may be configured to communicate with different devices, or in different operating modes, according to different SCS values. For example, the UE 115 may be configured to use a SCS of 15 kilohertz (kHz) in a first operating mode and to use a SCS of 30 kHz in a second operating mode. Although described as being used for communications, the SCS value may be used for particular types of communications, such as synchronization signal blocks (SSBs), PDCCHs, and others, and different types of communications may correspond to different SCS values. For example, an SSB may correspond to a different SCS than a PDCCH, as a non-limiting example. In some implementations, the CORESET configuration data 360 may allocate particular time and frequency resources to CORESET0-BR based on the SCS value. As an illustrative, non-limiting example, the CORESET configuration data 360 may allocate up to 14 OFDM symbols in the time domain and up to 24 PRBs in the frequency domain to CORESET0-BR for communications having a SCS of 15 kHz. As another illustrative, non-limiting example, the CORESET configuration data 360 may allocate up to 14 OFDM symbols in the time domain and up to 12 PRBs in the frequency domain to the CORESET0-BR for communications having a SCS of 30 kHz.

In addition to, or in the alternative to, defining the SCS value, the CORESET configuration data 360 may indicate the CCE-REG mapping data 364, the REG index data 366, the DMRS data 368, or a combination thereof. In some implementations, resource elements allocated to CORESET0-BR may be organized into REGs that each includes one resource block (e.g., PRB) that includes twelve resource elements in the frequency domain and one OFDM symbol in the time domain, and each resource element includes one subcarrier in the frequency domain. In such implementations, REGs may be organized into CCEs such that each CCE includes six REGs. A PDCCH defined within a CORESET typically corresponds to 1, 2, 4, 8, or 16 CCEs, however, because CORESET0-BR is allocated to a larger duration in the time domain that CORESET0 for other types of devices, a PDCCH defined within CORESET0-BR may correspond to more than 16 CCEs in some implementations. CORESET configuration data 360 may indicate organization of REGs, and CCEs, to enable devices such as the UE 115 to identify which time and frequency resources allocated to CORESET0-BR are assigned to a PDCCH. The CCE-REG mapping data 364 may indicate mappings of CCEs to REGs for CORESET0-BR for the UE 115. For example, the CCE-REG mapping data 364 may indicate the indices of REGs assigned to each of one or more CCEs of CORESET0-BR. This mapping of CCEs to REGs may be interleaved or non-interleaved.

The REG index data 366 may indicate which PRBs of the CORESET are assigned to each of the REGs, and the index of each of the REGs. PRB to REG assignment may be based on a fixed dimension in the time domain, a fixed dimension in the frequency domain, or based on a continuous pattern in the frequency domain but not the time domain, as non-limiting examples, as further described with reference to FIG. 6. The PRB to REG assignment may be based on the number of OFDM symbols allocated to CORESET0-BR, a pattern that is continuous in the time domain for REGs having the same frequency, a pattern that is continuous in the frequency domain for pairs of REGs having different frequencies, other parameters or patterns, or a combination thereof.

The DMRS data 368 may indicate an OFDM symbol allocated to a DMRS. In some implementations, the DMRS data 368 may indicate a relationship between the CORESET and the DMRS for a PDSCH in the time domain. For example, the DMRS data 368 may indicate which time resources (e.g., OFDM symbols) of those allocated to the CORESET (e.g., CORESET0-BR) are designated for communication of the PDSCH DMRS by the base station 105. In some implementations, DMRS data 368 may also indicate a starting symbol of the PDSCH DMRS. To illustrate, for a Type A PDSCH mapping, a PDSCH DMRS associated with a CORESET configured for other type of devices (e.g., non-superlight devices) typically starts at 0, 1, 2, or 3 OFDM symbol in the time domain, however, because CORESET0-BR is allocated to a larger duration in the time domain than CORESET0 for other types of devices, the PDSCH DMRS associated with CORESET0-BR may start at any one of the 0-12 OFDM symbols in the time domain. Similarly, for a Type B PDSCH mapping, a PDSCH DMRS associated with CORESET0-BR may be allocated to any one of 0-12 OFDM symbols in the time domain. As used herein, Type A PDSCH mapping refers to a configuration where a DMRS is fixed to a third or fourth position of a PDSCH in the time domain, and Type B PDSCH mapping refers to a configuration where a DMRS is fixed to a first position of a PDSCH in the time domain, as defined in a 3GPP specification. Some non-limiting example of DMRS parameters are given in Tables 1 and 2 below, where S is the index of the PDSCH starting symbol, L is the PDSCH length, normal cyclic prefix refers to each slot in the time domain being divided into 7 OFDM symbols, and extended cyclic prefix refers to each slot being divided into 6 OFDM symbols.

TABLE 1

PDSCH DMRS parameters for normal cyclic prefix

| PDSCH Mapping | Normal Cyclic Prefix | | |
| --- | --- | --- | --- |
| Type | S | L | S + L |
| Type A | {0, 1, 2, . . . 12} | {3, 4, 5, . . . 14} | {3, 4, 5, . . . 14} |
| Type B | {0, 1, 2, . . . 12} | {2, 4, 5, . . . 14} | {2, 4, 5, . . . 14} |

Note:
S = 3 is applicable only if DMRS-Type A position = 3

TABLE 2

PDSCH DMRS parameters for extended cyclic prefix

| PDSCH Mapping | Extended Cyclic Prefix | | |
| --- | --- | --- | --- |
| Type | S | L | S + L |
| Type A | {0, 1, 2, . . . 12} | {3, 4, 5, . . . 12} | {3, 4, 5, . . . 12} |
| Type B | {0, 1, 2, . . . 10} | {2, 4, 6} | {2, 4, 5, . . . 12} |

Note:
S = 3 is applicable only if DMRS-Type A position = 3

The DMRS data 368 may also include information corresponding to a repetition pattern for PDSCH DMRS. The repetition pattern may indicate that the PDSCH DMRS can be repeated after CORESET0-BR resource allocation (e.g., the set of time and frequency resources allocated to CORESET0-BR), or the repetition pattern may indicate that the PDSCH DMRS can be repeated during the time and frequency resources allocated to CORESET0-BR, as further described below with respect to FIGS. 8A and 8B.

The UE 115, after receiving and processing the first message 370, may monitor the set of time and frequency resources to receive the second message 374 from the base station 105. For example, after receiving and processing the CORESET configuration data 360, the UE 115 may monitor a set of time and frequency resources having the CORESET configuration (e.g., indicated by the resource allocation data 306). The set of time and frequency resources may be monitored to receive the second message 374 from the base station 105. The monitored time and frequency resources may include time resources, such as a starting time (e.g., an initial OFDM symbol or slot) and a duration (e.g., a total number of OFDM symbols or slots), and frequency resources, such as an initial frequency (e.g., a starting frequency or index of an initial PRB) and a total number of PRBs. The base station 105 may transmit the second message 374 within time and frequency resources that match the time and frequency resources monitored by the UE 115. In some implementations, the base station 105 may transmit the second message 374 using a portion of the set of time and frequency resources established by the CORESET configuration data 360. For example, CORESET0-BR defined by the CORESET configuration data 360 may be assigned to a PDCCH for transmitting the second message 374 as well as additional messages, such as a DMRS, as a non-limiting example.

The second message 374 may include downlink control information (DCI) that is transmitted within a PDCCH from the base station 105 and that indicates information to the UE 115 for determining additional resource allocations (e.g., scheduling or configurations) for downlink or uplink communications used to connect to the base station 105. For example, the second message 374 may include PDSCH resource allocation data 362 that allocates a second set of time and frequency resources (e.g., a set of time and frequency resources different from the set of time and frequency resources allocated by the CORESET configuration data 360) to a PDSCH from the base station 105. In some implementations, the PDSCH resource allocation data 362 may include additional downlink data from the base station, such as paging information, random-access response messages, and delivery of parts of the system information. After receiving and processing the second message 374, the UE 115 may monitor the set of time and frequency resources in accordance with the PDSCH resource allocation data 362 to receive additional messages, such as downlink data packets or other information, from the base station 105 via a PDSCH. Additionally or alternatively, the second message 374 may indicate an allocation of resources to one or more uplink channels for use by the UE 115 in messaging the base station 105. For example, the second message 374 may include resource allocation (e.g., a set of time and frequency resources) for a physical uplink control channel (PUCCH) or a physical uplink shared channel (PUSCH).

For other types of devices, a PDSCH typically is scheduled after CORESET0 in the time domain. However, because CORESET0-BR is allocated to a larger duration in the time domain than CORESET0 of other devices (e.g., non-superlight devices), the resources allocated to a PDSCH by the PDSCH resource allocation data 362 may be scheduled after CORESET0-BR in the time domain or may partially or entirely overlap with CORESET0-BR in the time domain. Additionally or alternatively, the resources allocated to the PDSCH by the PDSCH resource allocation data 362 may be different resources in the frequency domain (e.g., different PRBs) than are allocated to CORESET0-BR, or the PDSCH may partially or entirely overlap CORESET0-BR in the frequency domain. Examples of PDSCH resource allocation and CORESET0-BR resource allocations are described herein with respect to FIGS. 4 and 5.

As described with reference to FIG. 3, the present disclosure provides techniques for allocating time and frequency resources for CORESETs, such as CORESET0-BR, for wireless communication devices that support reduced bandwidth operation. For example, instead of using a CORESET configuration (e.g., an allocation of time and frequency resources) used by other types of devices (e.g., non-superlight devices), the UE 115 may receive a message indicating the CORESET configuration data 360, or the CORESET configuration data 360 may be determined based on information stored at the UE 115 and information, such as one or more communication parameters such as SCS, that is indicated by the first message 370. The CORESET configuration data 360 may allocate more than 3 OFDM symbols in the time domain to CORESET0-BR due to fewer PRBs being allocated to CORESET0-BR in the frequency domain based on the reduced operating bandwidth of UE 115. Thus, CORESET0-BR may be configured to include the same amount of information (e.g., DCIs in PDCCHs) as CORESET0 without exceeding the operating bandwidth of superlight devices. In this manner, wireless communication devices configured for reduced bandwidth operation, such as 20 MHz or less bandwidth, or 5 MHz or less bandwidth, may be able to establish effective communications with a 5G-NR network, which is typically designed for larger bandwidth operation.

Figure 4:
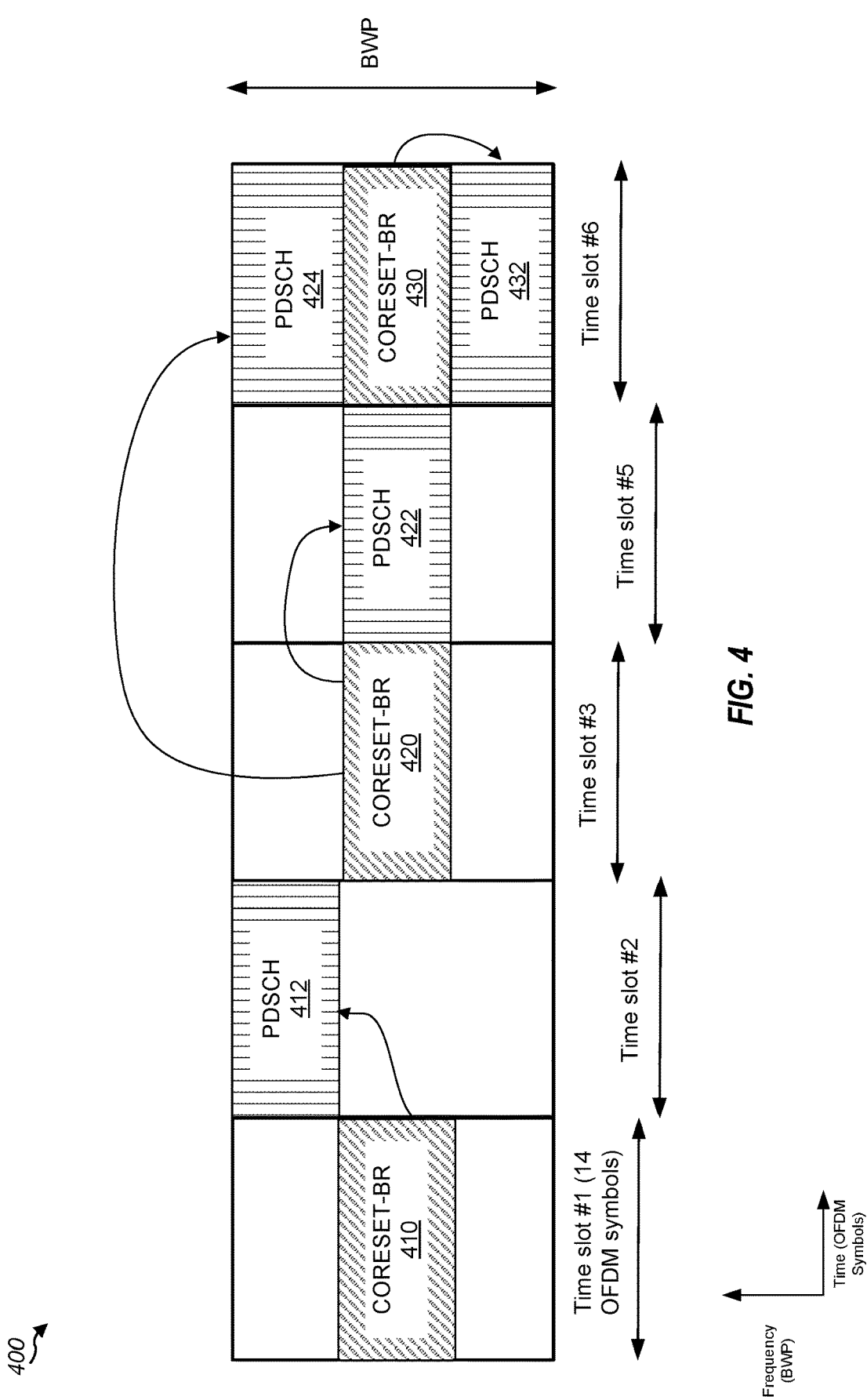
FIG. 4 shows a first configuration of control resource sets-bandwidth reduced (CORESET-BRs) and physical downlink shared channels (PDSCHs) that are scheduled by the CORESET-BRs according to one or more aspects.
Figure 5:
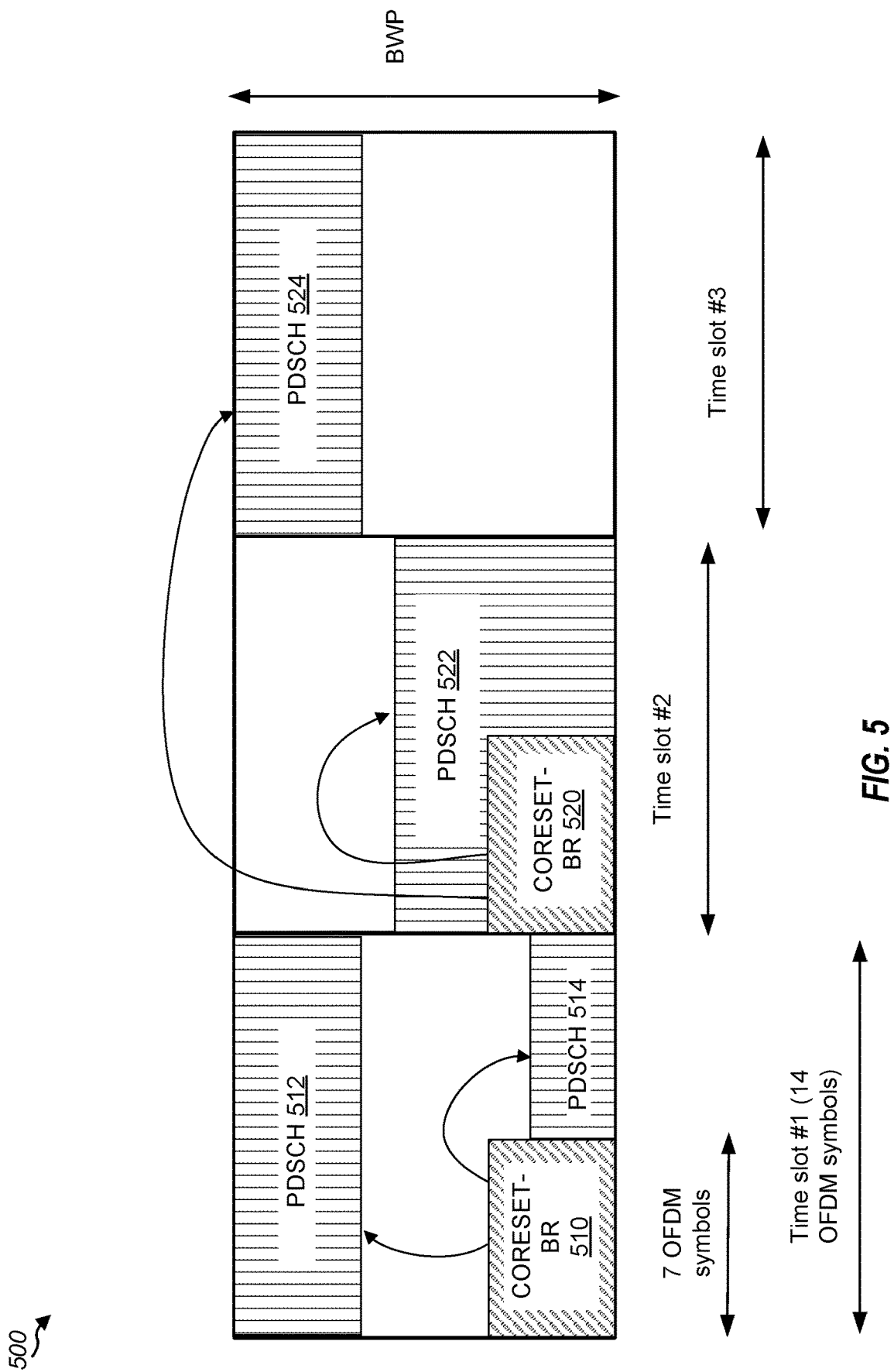
FIG. 5 shows a second configuration of CORESET-BRs and PDSCHs that are scheduled by the CORESET-BRs according to one or more aspects.

FIGS. 4 and 5 illustrate example allocations of resources in the time and frequency domains to PDSCHs and CORE-SETs according to one or more aspects. The CORESETs of FIGS. 4 and 5 ("CORESET-BR") may be initial CORESETs (e.g., may have an index of 0), or other CORESETs, that are defined for superlight devices (e.g., devices configured for receiving CORESET configurations allocating more than three OFDM symbols in the time domain and 20 MHz or less, or 5 MHz or less, in the frequency domain). As described above with reference to FIG. 3, CORESET-BR may be allocated to 4-14 OFDM symbols in the time domain and to 20 MHz or less (or 5 MHz or less) in the frequency domain. Examples of relative resource allocation of CORE-SET-BR and PDSCH for different CORESET-BR sizes (e.g., number of OFDM symbols occupied by CORESET-BR in the time domain) are shown in FIGS. 4-5.

FIG. 4 shows a first configuration 400 of CORESET-BRs and PDSCHs that are scheduled by the CORESET-BRs. In FIG. 4, CORESET-BRs 410, 420, and 430 and their associated PDSCHs 412, 422, 424, and 432 are allocated to 14 OFDM symbols in the time domain and 5 MHz or less in the frequency domain. In the example shown in FIG. 4, the CORESET-BR 410 may schedule (e.g., indicate an allocation of time and frequency resources to) the PDSCH 412, the CORESET-BR 420 may schedule the PDSCH 422 and the PDSCH 424, and the CORESET-BR 430 may schedule the PDSCH 432. In one aspect of this example, the sets of time and frequency resources allocated to a CORESET-BR and the corresponding PDSCH(s) may not overlap with each other in either the time domain or the frequency domain. For example, the CORESET-BR 410 may be allocated 14 OFDM symbols in a first time slot (e.g., time slot #1) and the PDSCH 412 may be allocated 14 OFDM symbols in a second time slot (e.g., time slot #2) that is different than the first time slot. Additionally, the CORESET-BR and the corresponding PDSCH may not overlap in the frequency domain. For example, the CORESET-BR 410 may be allocated PRBs within a first frequency range and the PDSCH 412 may be allocated PRBs with a second frequency range that is different than the first frequency range. In another aspect of the example shown in FIG. 4, the sets of time and frequency resources allocated to a CORESET-BR and a corresponding PDSCH may at least partially overlap in either the frequency domain or the time domain. For example, although the CORESET-BR 420 and the PDSCH 422 may be allocated 14 OFDM symbols in different time slots (e.g., CORESET-BR 420 may be allocated the OFDM symbols in time slot #3 and the PDSCH 424 may be allocated the OFDM symbols in time slot #6), the PRBs allocated to the CORESET-BR 420 and the PDSCH 422 may overlap in the frequency domain. The PRBs allocated to the CORESET-BR 420 and the PDSCH 422, as shown in FIG. 4, are allocated within a fully overlapping frequency range, however, in some implementations, the PRBs allocated to a CORESET-BR and a corresponding PDSCH may be allocated within partially overlapping frequency ranges. In yet another aspect of the example shown in FIG. 4, the sets of time and frequency resources allocated to a CORESET-BR and a corresponding PDSCH may at least partially overlap in the time domain but not in the frequency domain. For example, the CORESET-BR 430 and the PDSCH 432 may be allocated 14 OFDM symbols in the same time slot (e.g., both the CORESET-BR 430 and the PDSCH 432 may be allocated 14 symbols in time slot #6).

In the example shown in FIG. 4, PDSCHs corresponding to different CORESET-BRs may be allocated OFDM symbols within the same time slot and different non-overlapping frequency ranges. For example, CORESET-BR 420 may be allocated OFDM symbols in time slot #3 and corresponding PDSCH 424 may be allocated OFDM symbols in time slot #6. CORESET-BR 430 may be allocated OFDM symbols in time slot #6 and corresponding PDSCH 432 may also be allocated OFDM symbols in time slot #6, thereby resulting in PDSCHs that correspond to different CORESET-BRs being allocated the same OFDM symbols and time slot but different PRBs in the frequency domain.

FIG. 5 shows a second configuration 500 of CORESET-BRs and PDSCHs that are scheduled by the CORESET-BRs. In the example shown in FIG. 5, CORESET-BR 510 schedules PDSCHs 512 and 514, and CORESET-BR 520 schedules PDSCHs 522 and 524. CORESET-BRs 510 and 520, and PDSCHs 512, 514, 522, and 524 are allocated to at least 7 OFDM symbols in the time domain and 5 MHz or less in the frequency domain. In the example shown in FIG. 5, the CORESET-BR 510 may schedule the PDSCHs 512 and 514, and the CORESET-BR 520 may schedule the PDSCHs 522 and 524. In one aspect of this example, the resources allocated to a CORESET-BR and at least one of the corresponding PDSCHs may overlap with the CORESET-BR in either the time domain or the frequency domain. For example, the CORESET-BR 510 may be allocated the first 7 OFDM symbols in the time slot #1, PDSCH 514 may be allocated the second 7 OFDM symbols in the time slot #1, and the PDSCH 512 may be allocated the entire 14 OFDM symbols in the time slot #1. In such aspects, the CORESET-BR 510 overlaps in time domain with the PDSCH 512 (i.e., the OFDM symbols allocated to the CORESET-510 are scheduled at the same time as at least some of the OFDM symbols allocated to the PDSCH 512). Additionally, as shown in FIG. 5, CORESET-BRs and corresponding PDSCHs may overlay in the frequency domain. For example, the CORESET-BR 510 and the PDSCH 514 overlap in the frequency domain (i.e., the PRBs allocated to the CORESET-BR 510 and the PDSCH 514 are allocated within an at least partially overlapping frequency range). In another aspect of this example, the resources allocated to a CORESET-BR and a corresponding PDSCH may at least partially overlap in both the time domain and the frequency domain. For example, the CORESET-BR 520 may be allocated the first 7 OFDM symbols in the time slot #2 and the PDSCH 522 may be allocated an entirety of the 14 OFDM symbols in the time slot #2. In this example, the OFDM symbols allocated to CORESET-BR 520 are a portion of the OFDM symbols allocated to PDSCH 522. Additionally, the PRBs allocated to the CORESET-BR 520 and the PDSCH 522 may be allocated within an overlapping frequency range, as shown in FIG. 5.

Figure 6:
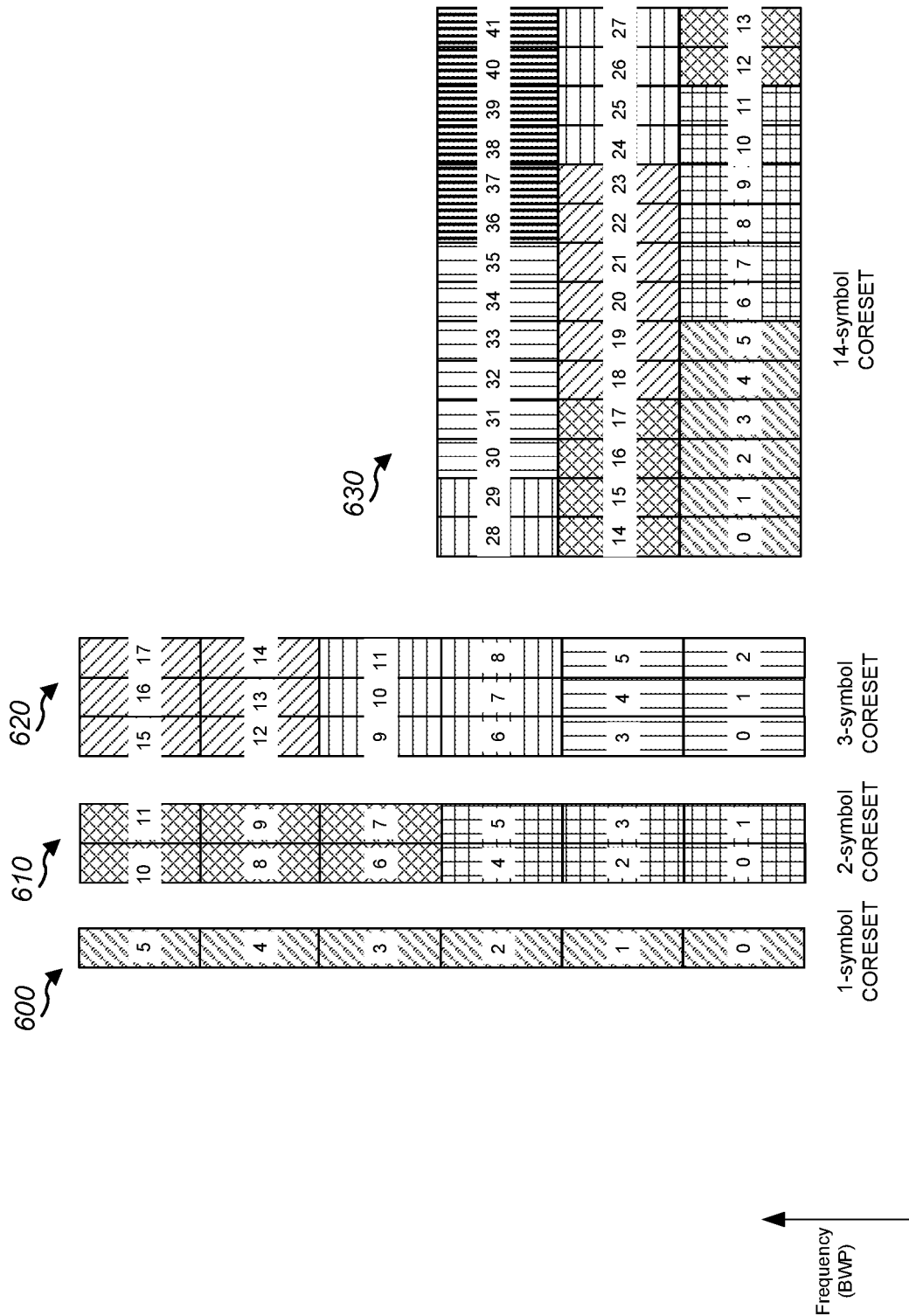
FIG. 6 illustrates examples of resource element group (REG) indexing and REG to control channel element (CCE) assignments according to one or more aspects.

FIG. 6 illustrates examples of REG indexing and REG to CCE assignments according to one or more aspects. In some implementations, the REG indexing of FIG. 6 may be indicated by the REG index data 366 of FIG. 3, and the REG to CCE assignments may be indicated by the CCE-REG mapping data 364 of FIG. 3. REGs, which also may be referred to as PRBs for a single OFDM symbol, are shown as blocks in FIG. 6. In the examples shown in FIG. 6, the REGs may be indexed in order of increasing time resources followed by increasing frequency resources, starting with an index of 0 for the first OFDM symbol and the lowest numbered PRB (e.g., the lowest frequency range assigned to a PRB or REG). Each consecutive six REGs may form a CCE, such that REGs from REG0 to REG5 form CCE0 and REGs from REG6 to REG11 form CCE1, as non-limiting examples. FIG. 6 illustrates a first example 600 of REG indexing and REG to CCE assignments, a second example 610 of REG indexing and REG to CCE assignments, a third example 620 of REG indexing and REG to CCE assignments, and a fourth example 630 of REG indexing and REG to CCE assignments, where each CCE includes six consecutively numbered REGs. The first example 600 corresponds to REG indexing and assignments for a 1-symbol CORESET. For example, because the CORESET is allocated to a single OFDM symbol in the time domain, the REG indexing may start with 0 for the lowest numbered REG (e.g., PRB), and the indexing may continue in an increasing order (e.g., from 0 to 5) in the frequency domain. The first six REGs (e.g., REGs 0-5) may be assigned to a first CCE. The next six REGs (at the same OFDM symbol and the next six highest frequency range) may be assigned to a second CCE, and REG to CCE assignment continues in this manner for an entirety of the bandwidth allocated to the CORESET.

An example of the foregoing is illustrated in the second example 610, which corresponds to REG indexing and assignments for a 2-symbol CORESET. For example, the REG indexing may start with 0 for the REG at the first OFDM symbol and a first frequency range, and it may continue in an increasing order in the time domain such that index 1 is assigned to the REG at the second OFDM symbol and the first frequency range. Once all REGs within the first frequency range are indexed, the indexing may continue to a REG at the first OFDM symbol and a second frequency range that is higher frequency the first frequency range, followed by a next REG at the second OFDM symbol and the second frequency range. This pattern of assigning increasing indices to pairs of REGs at the same frequency range may continue until all REGs are indexed, and REGs may then be assigned to CCEs in groups of six consecutive REGs in increasing order of indices, as indicated in the second example 610 by different shadings of the CCEs.

The third example 620 corresponds to REG indexing and assignments for a 3-symbol CORESET. The indexing pattern for REGs in the third example 620 is similar to the indexing pattern associated with the second example 610, with three REGs being assigned in increasing time-order for each frequency range (e.g., the indexing progresses from a third REG at the third OFDM symbol and the first frequency range to a fourth REG at the first OFDM symbol and the second frequency range). The fourth example 630 corresponds to REG indexing and assignments for a 14-symbol CORESET. The indexing pattern for REGs in the fourth example 630 is similar to the indexing patterns associated with the second example 610 and the third example 620, with 14 REGs being assigned in increasing time-order for each frequency range (e.g., the indexing progresses from a fourteenth REG at the fourteenth OFDM symbol and the first frequency range to a fifteenth REG at the first OFDM symbol and the second frequency range). In the third example 620 and the fourth example 630, REGs are assigned to CCEs in groups of six consecutively indexed REGs in increasing order, as indicated in FIG. 6 by different shadings of the CCEs. This type of REG indexing and REG to CCE assignment technique may be referred to as following a continuous pattern in the time domain.

FIGS. 7A and 7B illustrate additional examples of REG indexing and REG to CCE assignments in accordance with one or more aspects. In some implementations, the REG indexing of FIGS. 7A and 7B may be indicated by the REG index data 366 of FIG. 3, and the REG to CCE assignments may be indicated by the CCE-REG mapping data 364 of FIG. 3. Each consecutive six REGs may form a CCE, such that REGs from REG0 to REG5 form CCE0 and REGs from REG6 to REG11 form CCE1, as non-limiting examples.

FIG. 7A illustrates a first example 700 of REG indexing and REG to CCE assignment. The first example 700 corresponds to REG indexing and assignments for a 14-symbol CORESET. As an alternative to the continuous indexing pattern in the time domain described with reference to FIG. 6, the first example 700 is indexed according to a non-continuous pattern in the time domain, which may also be referred to as a "zig-zag" pattern. For example, the REG indexing may start with an index of 0 for the REG at the first OFDM symbol and a first frequency range and may continue in an increasing order in the time domain until the REG at the fourteenth OFDM symbol and the same frequency range is indexed as 13. The indexing may then continue to a REG at the same OFDM symbol (i.e., the fourteenth OFDM symbol) and a second frequency range that is higher than the first frequency range. The indexing may further continue in a reverse order in the time domain for REGs at the second frequency range. To illustrate, the REGs may be indexed in an increasing order from the REG at the fourteenth OFDM symbol and the second frequency range, which is indexed 14, to the REG at the first OFDM symbol and the second frequency range, which is indexed 27. The indexing may then continue to the REGs at the next frequency range (e.g., a third frequency range that is greater than the second frequency range), such that indexing progress in increasing order in the time domain from the REG at the first OFDM symbol and the third frequency range, which is indexed 28, to the REG at the fourteenth OFDM symbol and the third frequency range, which is indexed 41. This indexing pattern (interleaving indexing in increasing time order with indexing in decreasing time order for alternating frequency ranges) may continue for any remaining higher frequencies. After the REGs are indexed, the REGs may be assigned to CCEs in a similar manner as described with reference to FIG. 6, such that each group of 6 consecutive REGs are assigned to a CCE (as shown by different shading in FIG. 7A). Because the REGs are assigned to CCEs based on this non-continuous pattern in the time domain, a CCE may include REGs (e.g., PRBs) that at least partially overlap in the time domain but do not overlap in the frequency domain. For example, a CCE in the CORESET configuration may include a first number of REGs (e.g., REGs 12 and 13) in ascending order in the time domain and in a first frequency range and a second number of REGs (e.g., REGs 14-17) in descending order in the time domain and in a second frequency range. In this example, REGs 12 and 13 overlap REGs 14 and 15 in the time domain. Further, in this example, the number of REGs in the first frequency range is different from the number of REGs in the second frequency range.

FIG. 7B illustrates a second example 720 of REG indexing and REG to CCE assignment. The second example 720 corresponds to REG indexing and assignments for a 6-symbol CORESET. As an alternative to the non-continuous indexing pattern in the time domain described with reference to FIG. 7A, the second example 720 is indexed according to a block-based continuous pattern in the time domain, which may also be referred to as a "block indexing" pattern. For example, the REG indexing may start with 0 for the REG at the first OFDM symbol and a first frequency range and may continue in an increasing (or ascending) order in the time domain until an inflection OFDM symbol (e.g., a boundary OFDM symbol) that is not the last OFDM symbol in the first frequency range. This inflection OFDM symbol may facilitate forming a "block" in the block-based pattern as it is a last OFDM symbol of a block prior to a boundary between the block and another block and, as an illustrative, non-limiting example, may be located at a multiple of three OFDM symbols. For example, in the 6-symbol CORESET, the indexing may continue in an ascending order in the time domain until a third OFDM symbol, which is a multiple of three, and this REG is indexed as 2 in the second example 720. Similar to the indexing described with respect to FIG. 6, the indexing may then continue to a REG at the first OFDM symbol and a second frequency range which is higher than the first frequency range, which is indexed as 3. The indexing may further continue from the first OFDM symbol in the second frequency range in an ascending order until the inflection OFDM symbol and the second frequency range, i.e., the third OFDM symbol and the second frequency range. To illustrate, the REGs may be indexed in an increasing order from the REG at the first OFDM symbol and the second frequency range, which is indexed 3, to the REG at the third OFDM symbol and the second frequency range, which is indexed 5. This foregoing indexing in the first and second frequency ranges, starting from the first OFDM symbol in an ascending order to the third OFDM symbol in both the first and second frequency ranges to cover a block of 6 REGs is referred to as a "block indexing" pattern. The indexing may then continue to a second block, which includes indexing the remaining REGs following the inflection OFDM symbol in both the first and second frequency ranges, i.e., the indexing may continue from the REG at the fourth OFDM symbol and the first frequency range, which is indexed 6, in increasing order to the REG at the sixth OFDM symbol and the first frequency range, which is indexed 8, and then from the REG at the fourth OFDM symbol and the second frequency range, which is indexed 9, in increasing order to the REG at the sixth OFDM symbol and the second frequency range, which is indexed 11. This block indexing pattern may continue for the remaining OFDM symbols and frequencies. After the REGs are indexed, the REGs may be assigned to CCEs in a similar manner as described with reference to FIGS. 6 and 7A, such that each group of 6 consecutively indexed REGs are assigned to a CCE (as shown by different shading in FIG. 7B). This block-wise REG to CCE assignment may also be applied to 9-symbol CORESETs or 12-symbol CORESETs.

FIGS. 8A and 8B illustrate examples of CORESET, PDSCH, and DMRS resource allocation with respect to a CORESET (e.g., CORESET0-BR) for superlight devices according to one or more aspects. In some implementations, the PDSCH and DMRS resource allocations may be indicated by DCI received via a PDCCH within resources allocated to the CORESET, such as the second message 374 of FIG. 3.

FIG. 8A illustrates a first example 800 of CORESET, PDSCH, and DMRS allocation. In some implementations, the DMRS may be allocated one or more time resources (e.g., OFDM symbols) subsequent to the time resources allocated to the CORESET. To illustrate, in the first example 800, the DMRS 811 may be allocated the first OFDM symbol that is subsequent to a last OFDM symbol allocated to the CORESET 810. In addition to a DMRS being allocated to the first OFDM symbol subsequent to the last OFDM symbol allocated to the CORESET, in some implementations, the DMRS (e.g., DMRS 813) may be repeated at a second OFDM symbol (different from the first OFDM symbol) within a time slot that may be allocated to a PDSCH 812. Repeating the DMRS may improve demodulation of signals within PDSCHs, particularly PDSCHs that are scheduled for long durations in the time domain.

FIG. 8B illustrates a second example 850 of CORESET, PDSCH, and DMRS allocation. In some implementations, a DMRS may be repeated during one or more time resources allocated to a CORESET, in addition to the time resources of the first example 800. To illustrate, in implementations where a PDSCH 822 is scheduled to overlap in the time domain with a CORESET 820 and the CORESET size in the time domain is larger than 3 OFDM symbols, additional DMRS (e.g., DMRS 821) repetition may be allocated to a first OFDM symbol allocated to both the PDSCH 822 and the CORESET 820. Additional repetition of a DMRS at different times may improve demodulation of signals received within PDSCHs.

Figure 9:
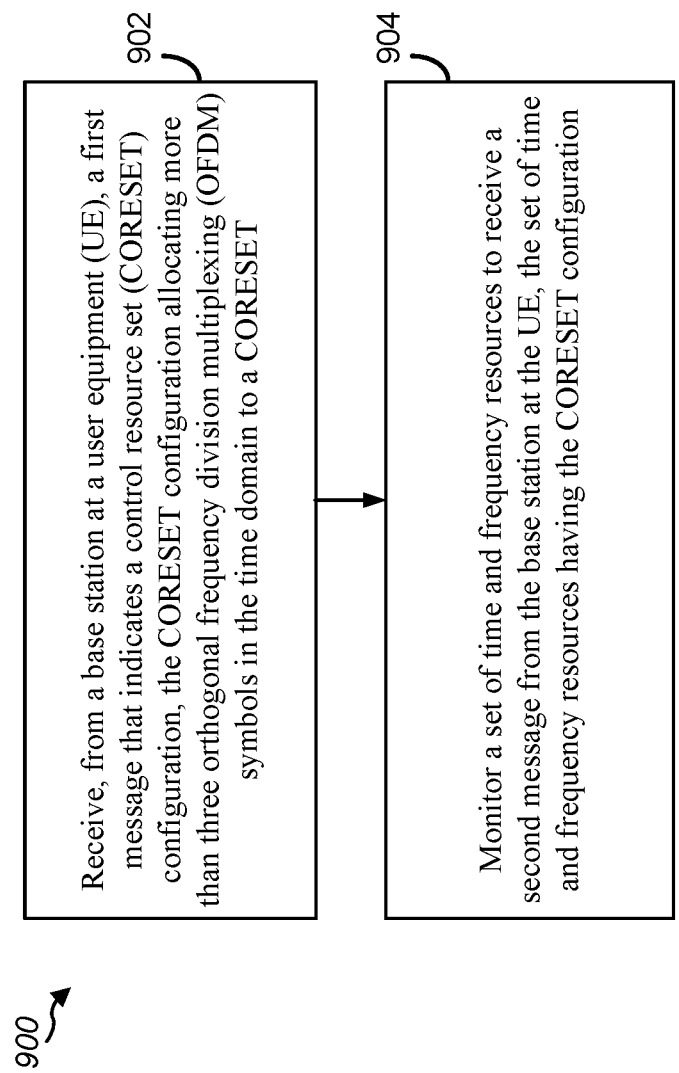
FIG. 9 is a flow diagram illustrating an example process that supports allocating CORESETs to more than three orthogonal frequency division multiplexing (OFDM) symbols in the time domain for reduced bandwidth devices according to one or more aspects.

FIG. 9 is a flow diagram illustrating an example process 900 that supports allocating CORESETs to more than three OFDM symbols in the time domain for reduced bandwidth (e.g., superlight) devices according to one or more aspects. Operations of the process 900 may be performed by a UE, such as UE 115 described above with reference to FIGS. 1, 2, 3, or a UE described with reference to FIG. 10. For example, example operations (also referred to as "blocks") of process 900 may enable the UE 115 to support CORESETs for use by reduced bandwidth devices according to one or more aspects.

In block 902, the UE receives, from a base station, a first message that indicates a CORESET configuration allocating more than three OFDM symbols in the time domain to a CORESET, e.g., CORESET0-BR. For example, the CORESET configuration may include or correspond to CORESET configuration data 360 of FIG. 3. In some implementations, the first message includes a RRC message, such as a MIB communicated within a PBCH. For example, the first message may include or correspond to the first message 370 of FIG. 3. In block 904, the UE monitors a set of time and frequency resources to receive a second message from the base station. The set of time and frequency resources are allocated based on the CORESET configuration. For example, the monitored set of time and frequency resources may include or correspond to the monitored time and frequency resources data 308 of FIG. 3. In some implementations, the second message includes DCI that is communicated within a PDCCH.

In some implementations, the process 900 may include receiving, by the UE from the base station via a portion of the set of time and frequency resources allocated based on the CORESET configuration, the second message indicating a resource allocation for a PDSCH. For example, the resource allocation for the PDSCH may include or correspond to the PDSCH resource allocation data 362 of FIG. 3. Additionally or alternatively, the CORESET configuration may indicate other communication parameters such as a SCS value for the UE, and based on the SCS value, the CORESET configuration may allocate different sets of resources to the UE. For example, the CORESET configuration may allocate up to 14 OFDM symbols in the time domain and up to 24 PRBs in the frequency domain to the CORESET for communications having a SCS of 15 kHz. As another example, the CORESET configuration may allocate up to 14 OFDM symbols in the time domain and up to 12 PRBs in the frequency domain to the CORESET for communications having a SCS of 30 kHz.

In some implementations, the CORESET configuration may indicate or allocate one or more PRBs within a first time slot and a first frequency range. For example, with reference to FIG. 4, the PRBs indicated or allocated by the CORESET configuration may include or correspond to CORESET-BR 410 and the first time slot may include or correspond to time slot #1. In some such implementations, the CORESET-BR 410 may schedule the corresponding PDSCH 412 at time slot #2. In such implementations, the first time slot (e.g., time slot #1) may be different than any time slot (e.g., time slot #2) included in the resource allocation for the PDSCH. Further, in such implementations, the first frequency range may be different than a second frequency range included in the resource allocation for the PDSCH, as is illustrated in FIG. 4 with respect to CORESET-BR 410 and PDSCH 412. Additionally or alternatively, the CORESET configuration may indicate or allocate one or more PRBs within a first time slot and a first frequency range. For example, with respect to FIG. 4, the CORESET configuration may indicate CORESET-BR 420 as being at time slot #3 and a first frequency range, and the CORESET-BR 420 may schedule the corresponding PDSCH 422 at time slot #5. In such implementations, the time slot of CORESET-BR 420 may be different than any time slot included in the resource allocation for the PDSCH 422. Further, in some such implementations, the first frequency range at least partially overlaps a second frequency range included in the resource allocation for the PDSCH. For example, as illustrated in FIG. 4, the PDSCH 422 may be in the first frequency range which overlaps with the frequency range associated with CORESET-BR 420. Alternatively, the CORESET configuration may indicate or allocate one or more PRBs within a first frequency range and a first time slot that is included in the resource allocation for the PDSCH, and the first frequency range is different than a second frequency range included in the resource allocation for the PDSCH. For example, with reference to FIG. 4, both CORESET-BR 430 and the corresponding PDSCH 432 may be at the same time slot (i.e., time slot #6) but in different frequency ranges (e.g., a first frequency range and a second frequency range, respectively), as is illustrated in FIG. 4 with respect to the CORESET-BR 430 and the PDSCH 432. Alternatively, the first and second frequency ranges may at least partially overlap with each other, as is illustrated in FIG. 5 with respect to the CORESET-BR 520 and the corresponding PDSCH 522.

In some implementations, a CCE in the CORESET configuration includes a first number of REGs in ascending order in a first frequency range and a second number of REGs in descending order in a second frequency range. For example, with reference to FIG. 7A, a third CCE may include REGs 12 and 13 in ascending order in a first frequency range and REGs 14-17 in descending order in a second frequency range (e.g., the ascending and descending orders may be with reference to the time domain). In such implementations, some of the REGs (e.g., REG 12 and 13) in the CCE may overlap in the time domain with other REGs (e.g., the REGs 14-17) in the CCE. Additionally or alternatively, the number of REGs in the first frequency range (e.g., REGs 12 and 13) and the number of REGs in the second frequency range (e.g., REG 14-17) may be different. In some other implementations, a CCE in the CORESET configuration may include a first number of REGs in ascending order in a first frequency range and a second number of REGs in ascending order in a second frequency range. For example, with reference to FIG. 7B, the first CCE may include REGs 0-2 in ascending order in a first frequency range and REGs 3-5 also in ascending order in a second frequency range (e.g., both the ascending orders may be with reference to the time domain). In such implementations, each REG in the first frequency range (e.g., REGs 0-2) is within the same OFDM symbol in the time domain as a corresponding REG in the second frequency range (e.g., REGs 3-5). In some such implementations, the CORESET configuration may allocate a multiple of three OFDM symbols to the CORESET, as is shown in FIG. 7B with respect to the OFDM symbols in each CCE being allocated three OFDM symbols (and a CORESET corresponds to one or more CCEs).

In some implementations, the process 900 includes monitoring for a DMRS at a first OFDM symbol that is subsequent to a last OFDM symbol allocated to the CORESET by the CORESET configuration. For example, with reference to FIG. 8A, the DMRS 811 may be allocated the first OFDM symbol that is subsequent to a last OFDM symbol allocated to the CORESET 810. In some such implementations, the process 900 includes monitoring for an additional portion of the DMRS at a second OFDM symbol within a time slot that is allocated to the PDSCH. For example, with reference to FIG. 8A, the DMRS 813 may be repeated at a second OFDM symbol (different from the first OFDM symbol) within a time slot that may be allocated to the PDSCH 812. In some implementations, the process 900 includes monitoring, based on a number of OFDM symbols allocated to the CORESET by the CORESET configuration satisfying a threshold, for a DMRS at a first OFDM symbol allocated to the CORESET by the CORESET configuration and a first OFDM symbol subsequent to a last OFDM symbol allocated to the CORESET by the CORESET configuration. For example, with reference to FIG. 8B, because the PDSCH 822 is scheduled to overlap in the time domain with the CORESET 820 and the CORESET size in the time domain is larger than 3 OFDM symbols, a UE may monitor for the DMRS 821 (e.g., DMRS repetition) at a first OFDM symbol allocated to both the PDSCH 822 and the CORESET 820.

Figure 10:
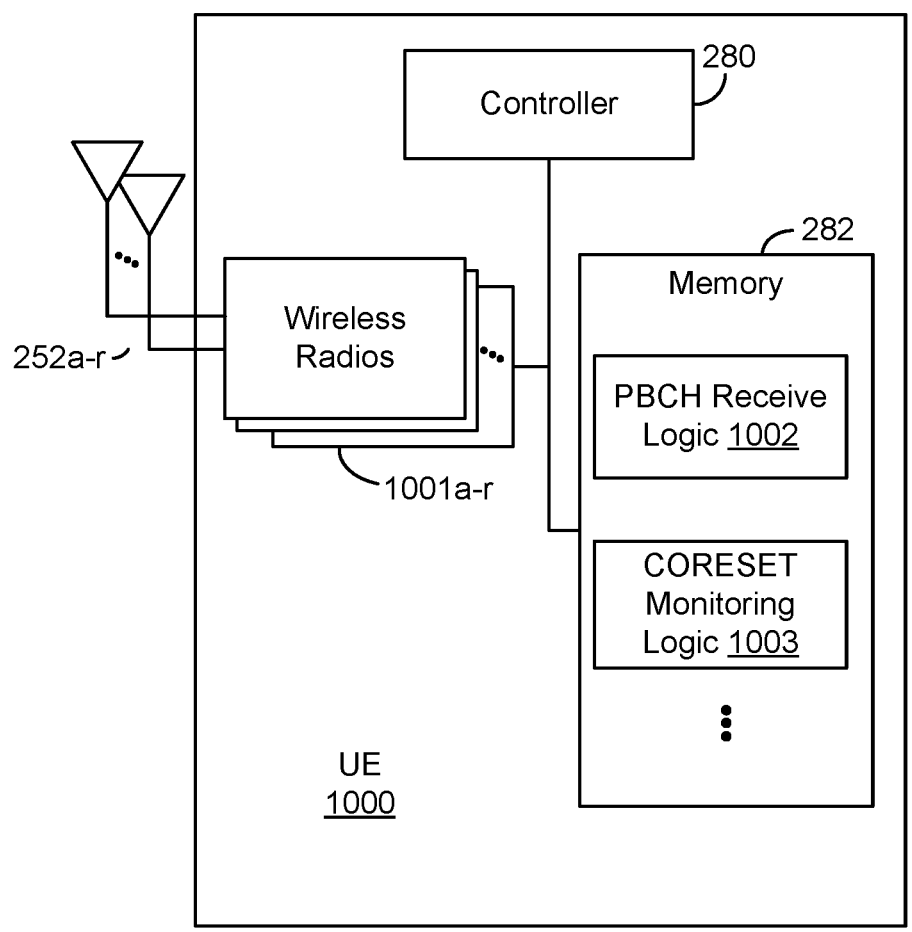
FIG. 10 is a block diagram of an example user equipment (UE) that supports allocating CORESETs to more than three OFDM symbols in the time domain for reduced bandwidth devices according to one or more aspects.

FIG. 10 is a block diagram of an example UE 1000 that supports allocating CORESETs to more than three OFDM symbols in the time domain for reduced bandwidth (e.g., superlight) devices according to one or more aspects. In some implementations, the UE 1000 may be a reduced bandwidth (e.g., superlight) device. The UE 1000 may be configured to perform operations, including the blocks of the process 900 described with reference to FIG. 9. In some implementations, UE 1000 includes the structure, hardware, and components shown and described with reference to UE 115 of FIGS. 1-3. For example, the UE 1000 includes the controller 280, which operates to execute logic or computer instructions stored in the memory 282, as well as controlling the components of the UE 1000 that provide the features and functionality of the UE 1000. The UE 1000, under control of the controller 280, transmits and receives signals via wireless radios 1001a-r and the antennas 252a-r. The wireless radios 1001a-r include various components and hardware, as illustrated in FIG. 2 for the UE 115, including the modulator and demodulators 254a-r, the MIMO detector 256, the receive processor 258, the transmit processor 264, and the TX MIMO processor 266.

Figure 12:
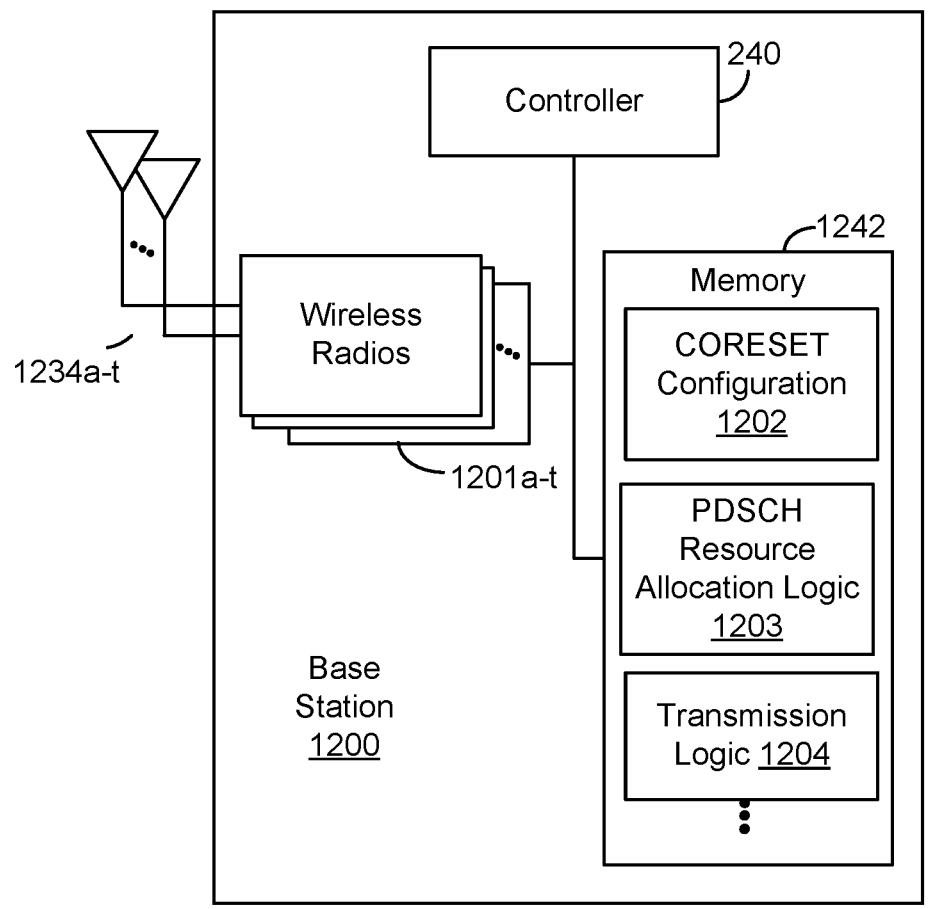
FIG. 12 is a block diagram of an example base station that supports allocating CORESETs to more than three OFDM symbols in the time domain for reduced bandwidth devices according to one or more aspects.

As shown, the memory 282 may include PBCH receive logic 1002 and CORESET monitoring logic 1003. The PBCH receive logic 1002 may be configured to receive a first message that indicates a CORESET configuration within a PBCH. The CORESET configuration allocates more than three OFDM symbols in the time domain to a CORESET. The CORESET monitoring logic 1003 may be configured to monitor a set of time and frequency resources to receive a second message from the base station. The set of time and frequency resources have the CORESET configuration. The UE 1000 may receive signals from or transmit signals to one or more network entities, such as base station 105 of FIGS. 1-3 or a base station as illustrated in FIG. 12.

Figure 11:
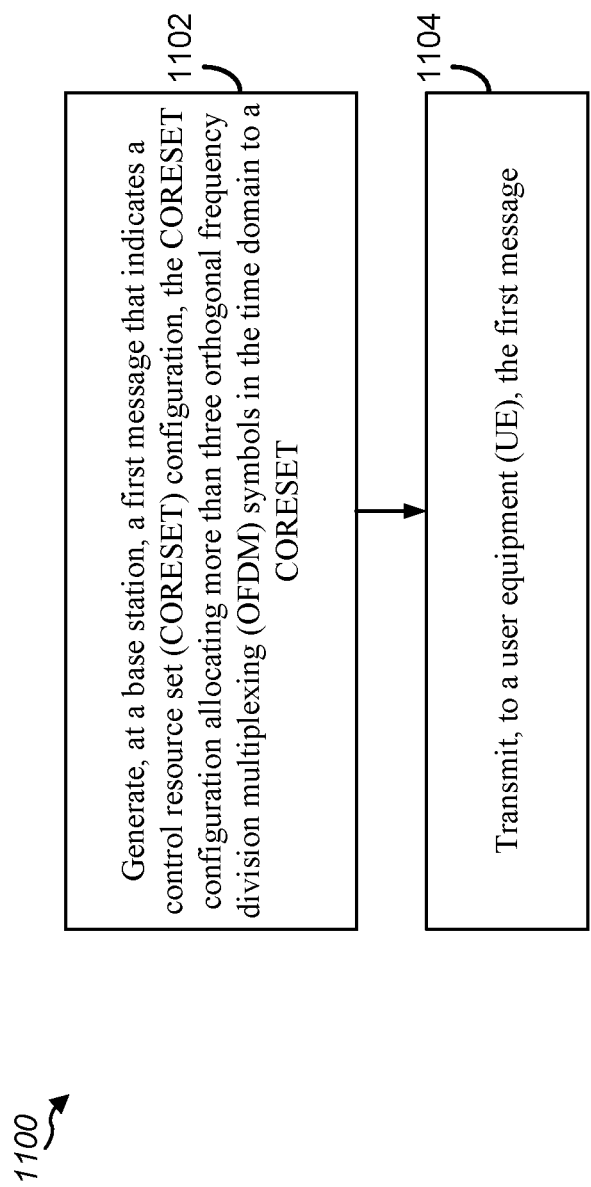
FIG. 11 is a flow diagram illustrating an example process that supports generating CORESETs to more than three OFDM symbols in the time domain for reduced bandwidth devices according to one or more aspects.

FIG. 11 is a flow diagram illustrating an example process 1100 that supports generating CORESETs to more than three OFDM symbols in the time domain for reduced bandwidth (e.g., superlight) devices according to one or more aspects. Operations of process 1100 may be performed by a base station, such as base station 105 described above with reference to FIGS. 1-3 or a base station as described below with reference to FIG. 12.

At block 1102, the base station generates a first message that indicates a CORESET configuration allocating more than three OFDM symbols in the time domain to a CORESET, e.g., CORESET0-BR. For example, the CORESET configuration may include or correspond to the CORESET configuration data 360 of FIG. 3. In some implementations, the first message includes a RRC message, such as a MIB communicated within a PBCH. In block 1104, the base station transmits the first message to a UE. For example, the first message may include or correspond to first message 370 of FIG. 3.

In some implementations, the process 1100 may further include transmitting, to the UE, a second message via a set of time and frequency resources having the CORESET configuration. The second message indicates a resource allocation for a PDSCH. For example, the second message may include or correspond to the second message 374 of FIG. 3, and the resource allocation of the PDSCH may include or correspond to the PDSCH resource allocation data 362 of FIG. 3.

In some implementations, the process 1100 includes transmitting, to the UE, DCI via a set of time and frequency resources having the CORESET configuration. For example, the DCI may include or correspond to the second message 374 of FIG. 3. In such implementations, the DCI indicates a resource allocation for a PDSCH, and a starting symbol of the PDSCH includes one of a fourth OFDM symbol to a twelfth OFDM symbol of a slot allocated to the PDSCH by the resource allocation. For example, with reference to FIG. 3, the second message 374 includes the PDSCH resource allocation data 362 and includes information regarding a starting symbol of the PDSCH, which may indicate a starting OFDM symbol of the PDSCH as shown in Tables 1 and 2.

In some implementations, the process 1100 includes transmitting a DMRS at a first OFDM symbol that is subsequent to a last OFDM symbol allocated to the CORESET by the CORESET configuration. For example, with reference to FIG. 8A, the DMRS 811 may be allocated the first OFDM symbol that is subsequent to a last OFDM symbol allocated to the CORESET 810. In some such implementations, the process 1100 includes transmitting an additional portion of the DMRS at a second OFDM symbol within a time slot that is allocated to a PDSCH. For example, with reference to FIG. 8A, the DMRS 813 may be repeated at a second OFDM symbol (different from the first OFDM symbol) within a time slot that may be allocated to the PDSCH 812. Additionally or alternatively, the process 1100 may include transmitting, based on a number of OFDM symbols allocated to the CORESET by the CORESET configuration satisfying a threshold, a DMRS at a first OFDM symbol allocated to the CORESET by the CORESET configuration and a first OFDM symbol subsequent to a last OFDM symbol allocated to the CORESET by the CORESET configuration. For example, with reference to FIG. 8B, the DMRS 821 (e.g., additional DMRS repetition) may be allocated to a first OFDM symbol allocated to both the PDSCH 822 and the CORESET 820 if the number of OFDM symbols allocated to the CORESET 820 satisfies a threshold. In some such implementations, the threshold may be 3, or any integer between 3 and 12.

FIG. 12 is a block diagram of an example base station 1200 that supports generating CORESETs to more than three OFDM symbols in the time domain for reduced bandwidth (e.g., superlight) devices according to one or more aspects. The base station 1200 may be configured to perform operations, including the blocks of process 1100 described with reference to FIG. 11. In some implementations, the base station 1200 includes the structure, hardware, and components shown and described with reference to the base station 105 of FIGS. 1-3. For example, the base station 1200 may include controller 240, which operates to execute logic or computer instructions stored in the memory 1242, as well as controlling the components of the base station 1200 that provide the features and functionality of the base station 1200. The base station 1200, under control of the controller 240, transmits and receives signals via wireless radios 1201*a-t* and antennas 1234*a-t*. Wireless radios 1201*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 1242 may include CORESET configuration logic 1202, PDSCH resource allocation logic 1203, and transmission logic 1204. The CORESET configuration logic 1202 may be configured to generate a first message that indicates a CORESET configuration. The CORESET configuration allocates more than three OFDM symbols in the time domain to a CORESET. The PDSCH resource allocation logic 1203 may be configured to generate a PDSCH resource allocation to be included in a second message. The PDSCH resource allocation may indicate time and frequency resources allocated to a PDSCH. The transmission logic 1204 may be configured to transmit the first message and the second message to a UE. The base station 1200 may transmit signals to or receive signals from one or more network entities, such as the UE 115 of FIGS. 1-3 or the UE 1000 of FIG. 10.

It is noted that one or more blocks (or operations) described with reference to FIGS. 9 and 11 may be combined with one or more blocks (or operations) described with reference to another of the figures. For example, one or more blocks (or operations) of FIG. 9 may be combined with one or more blocks (or operations) of FIG. 11. As another example, one or more blocks associated with FIGS. 9 and 11 may be combined with one or more blocks (or operations) associated with FIGS. 1-3. Additionally, or alternatively, one or more operations described above with reference to FIGS. 1-3 may be combined with one or more operations described with reference to FIG. 10 or 12.

In one or more aspects, techniques for supporting CORESETS allocated to more than three OFDM symbols in the time domain for reduced bandwidth devices may include additional aspects, such as any single aspect or any combination of aspects described below or in connection with one or more other processes or devices described elsewhere herein. In a first aspect, supporting allocating CORESETs to more than three OFDM symbols in the time domain for reduced bandwidth (e.g., superlight) devices may include an apparatus configured to receive, from a base station, a first message that indicates a CORESET configuration. The CORESET configuration allocates more than three OFDM symbols in the time domain to a CORESET. The apparatus is further configured to monitor a set of time and frequency resources to receive a second message from the base station. The set of time and frequency resources have the CORESET configuration. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the first message includes an RRC message and the second message includes DCI.

In a third aspect, in combination with one or more of the first aspect or the second aspect, the apparatus is configured to receive, from the base station via a portion of the set of time and frequency resources having the CORESET configuration, the second message indicating a resource allocation for a PDSCH.

In a fourth aspect, in combination with one or more of the first through third aspects, the CORESET configuration is associated with communications between the apparatus and the base station via a BWP that is less than 5 MHz. The CORESET configuration allocates between 4 and 14 OFDM symbols in the time domain to the CORESET.

In a fifth aspect, in combination with one or more of the first through fourth aspects, the CORESET configuration allocates up to 14 OFDM symbols in the time domain and up to 24 PRBs in the frequency domain to the CORESET for communications having a SCS of 15 KHz.

In a sixth aspect, in combination with one or more of the first through fifth aspects, the CORESET configuration allocates up to 14 OFDM symbols in the time domain and up to 12 PRBs in the frequency domain to the CORESET for communications having a SCS of 30 KHz.

In a seventh aspect, in combination with one or more of the first through sixth aspects, the second message indicates a resource allocation for a PDSCH. The CORESET configuration allocates at least one of: one or more PRBs within a first time slot and a first frequency range, where the first time slot is different than any time slot included in the resource allocation for the PDSCH, and where the first frequency range is different than a second frequency range included in the resource allocation for the PDSCH; one or more PRBs within a first time slot and a first frequency range, where the first time slot is different than any time slot included in the resource allocation for the PDSCH, and where the first frequency range at least partially overlaps a second frequency range included in the resource allocation for the PDSCH; one or more PRBs within a first time slot and a first frequency range, where the first time slot is included in the resource allocation for the PDSCH, and where the first frequency range is different than a second frequency range included in the resource allocation for the PDSCH; or one or more PRBs within a first time slot and a first frequency range, where the first time slot is included in the resource allocation for the PDSCH, and where the first frequency range at least partially overlaps a second frequency range included in the resource allocation for the PDSCH.

In an eighth aspect, in combination with one or more of the first through seventh aspects, a CCE in the CORESET configuration includes a particular number of REGs. A first number of REGs in ascending order in a first frequency range and a second number of REGs in descending order in a second frequency range form the CCE. At least some of the first REGs and the second REGs overlap in the time domain In a ninth aspect, in combination with the eighth aspect, the first number of REGs is different than the second number of REGs.

In a tenth aspect, in combination with one or more of the first through seventh aspects, a CCE in the CORESET configuration includes a particular number of REGs. A first number of REGs in ascending order in a first frequency range and a second number of REGs in ascending order in a second frequency range form the CCE. Each REG of the first number of REGs is within a same OFDM symbol in the time domain as a corresponding REG of the second number of REGs.

In an eleventh aspect, in combination with the tenth aspect, the CORESET configuration allocates a multiple of three OFDM symbols to the CORESET.

In a twelfth aspect, in combination with one or more of the first through eleventh aspects, the second message indicates a resource allocation for a PDSCH. A starting symbol of the PDSCH includes one of a fourth OFDM symbol to a twelfth OFDM symbol of a slot allocated to the PDSCH by the resource allocation.

In a thirteenth aspect, in combination with one or more of the first through twelfth aspects, the apparatus is configured to monitor for a DMRS at a first OFDM symbol that is subsequent to a last OFDM symbol allocated to the CORESET by the CORESET configuration.

In a fourteenth aspect, in combination with the thirteenth aspect, the apparatus is configured to monitor for an additional portion of the DMRS at a second OFDM symbol within a time slot that is allocated to a PDSCH by a resource allocation for the PDSCH that is included in the second message.

In a fifteenth aspect, in combination with one or more of the first through fourteenth aspects, the apparatus is configured to monitor, based on a number of OFDM symbols allocated to the CORESET by the CORESET configuration satisfying a threshold, for a DMRS at a first OFDM symbol allocated to the CORESET by the CORESET configuration and a first OFDM symbol subsequent to a last OFDM symbol allocated to the CORESET by the CORESET configuration.

In a sixteenth aspect, supporting allocating CORESETs to more than three OFDM symbols in the time domain for reduced bandwidth (e.g., superlight) devices may include an apparatus configured to generate a first message that indicates a CORESET configuration. The CORESET configuration allocates more than three OFDM symbols in the time domain to a CORESET. The apparatus is further configured to transmit, to UE, the first message. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a seventeenth aspect, in combination with the sixteenth aspect, the apparatus is configured to transmit, to the UE, a second message via a set of time and frequency resources having the CORESET configuration. The second message indicates a resource allocation for a PDSCH.

In an eighteenth aspect, in combination with the seventeenth aspect, the CORESET configuration allocates: one or more PRBs within a first time slot and a first frequency range, where the first time slot is different than any time slot included in the resource allocation for the PDSCH, and where the first frequency range is different than a second frequency range included in the resource allocation for the PDSCH; one or more PRBs within a first time slot and a first frequency range, where the first time slot is different than any time slot included in the resource allocation for the PDSCH, and where the first frequency range at least partially overlaps a second frequency range included in the resource allocation for the PDSCH; one or more PRBs within a first time slot and a first frequency range, where the first time slot is included in the resource allocation for the PDSCH, and where the first frequency range is different than a second frequency range included in the resource allocation for the PDSCH; or one or more PRBs within a first time slot and a first frequency range, where the first time slot is included in the resource allocation for the PDSCH, and where the first frequency range at least partially overlaps, a second frequency range included in the resource allocation for the PDSCH.

In a nineteenth aspect, in combination with one or more of the sixteenth through eighteenth aspects, a CCE in the CORESET configuration includes a particular number of REGs. A first number of REGs in ascending order in a first frequency range and a second number of REGs in descending order in a second frequency range form the CCE. At least some of the first REGs and the second REGs overlap in the time domain.

In a twentieth aspect, in combination with one or more of the sixteenth through eighteenth aspects, a CCE in the CORESET configuration includes a particular number of REGs. A first number of REGs in ascending order in a first frequency range and a second number of REGs in ascending order in a second frequency range form the CCE. Each REG of the first number of REGs is within a same OFDM symbol in the time domain as a corresponding REG of the second number of REGs.

In a twenty-first aspect, in combination with one or more of the sixteenth through twentieth aspects, the apparatus is configured to transmit, to the UE, DCI via a set of time and frequency resources having the CORESET configuration. The DCI indicates a resource allocation for a PDSCH. A starting symbol of the PDSCH includes one of a fourth OFDM symbol to a twelfth OFDM symbol of a slot allocated to the PDSCH by the resource allocation.

In a twenty-second aspect, in combination with one or more of the sixteenth through twenty-first aspects, the apparatus is configured to transmit, to the UE, a DMRS at a first OFDM symbol that is subsequent to a last OFDM symbol allocated to the CORESET by the CORESET configuration.

In a twenty-third aspect, in combination with one or more of the sixteenth through twenty-second aspects, the apparatus is configured to transmit, to the UE, a second message via a set of time and frequency resources having the CORESET configuration. The second message indicates a resource allocation for a PDSCH. The apparatus is also configured to transmit, to the UE, an additional portion of the DMRS at a second OFDM symbol within a time slot that is allocated to the PDSCH.

In a twenty-fourth aspect, in combination with one or more of the sixteenth through twenty-third aspects, the apparatus is configured to transmit, to the UE and based on a number of OFDM symbols allocated to the CORESET by the CORESET configuration satisfying a threshold, a DMRS at a first OFDM symbol allocated to the CORESET by the CORESET configuration and a first OFDM symbol subsequent to a last OFDM symbol allocated to the CORESET by the CORESET configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
   receiving, from a base station at a user equipment (UE), a first message that indicates a control resource set (CORESET) configuration, the CORESET configuration corresponding to communications between the UE and the base station via a bandwidth part (BWP) that is less than 5 megahertz (MHz), the CORESET configuration allocating between 4 and 14 orthogonal frequency division multiplexing (OFDM) symbols in the time domain to a CORESET;
   monitoring a set of time and frequency resources to receive a second message from the base station at the UE, the set of time and frequency resources having the CORESET configuration; and
   wherein the first message includes a radio resource control (RRC) message, and wherein the second message includes downlink control information (DCI).

2. The method of claim 1 further comprising:
   receiving, from the base station at the UE via a portion of the set of time and frequency resources having the CORESET configuration, the second message indicating a resource allocation for a physical downlink shared channel (PDSCH).

3. The method of claim 1, wherein the CORESET configuration allocates up to 14 OFDM symbols in the time domain and up to 24 physical resource blocks (PRBs) in the frequency domain to the CORESET for communications having a subcarrier spacing (SCS) of 15 kilohertz (KHz).

4. The method of claim 1, wherein the CORESET configuration allocates up to 14 OFDM symbols in the time domain and up to 12 physical resource blocks (PRBs) in the frequency domain to the CORESET for communications having a subcarrier spacing (SCS) of 30 kilohertz (KHz).

5. The method of claim 1, wherein the second message indicates a resource allocation for a physical downlink shared channel (PDSCH), and wherein the CORESET configuration allocates at least one of:
   one or more physical resource blocks (PRBs) within a first time slot and a first frequency range, wherein the first time slot is different than any time slot included in the resource allocation for the PDSCH, and wherein the first frequency range is different than a second frequency range included in the resource allocation for the PDSCH;
   one or more physical resource blocks (PRBs) within a first time slot and a first frequency range, wherein the first time slot is different than any time slot included in the resource allocation for the PDSCH, and wherein the first frequency range at least partially overlaps a second frequency range included in the resource allocation for the PDSCH;
   one or more physical resource blocks (PRBs) within a first time slot and a first frequency range, wherein the first time slot is included in the resource allocation for the PDSCH, and wherein the first frequency range is different than a second frequency range included in the resource allocation for the PDSCH; or
   one or more physical resource blocks (PRBs) within a first time slot and a first frequency range, wherein the first time slot is included in the resource allocation for the PDSCH, and wherein the first frequency range at least partially overlaps a second frequency range included in the resource allocation for the PDSCH.

6. The method of claim 1, wherein a control channel element (CCE) in the CORESET configuration includes a particular number of resource element groups (REG), wherein a first number of REGs in ascending order in a first frequency range and a second number of REGs in descending order in a second frequency range form the CCE, and wherein at least some of the first REGs and the second REGs overlap in the time domain.

7. The method of claim 6, wherein the first number of REGs is different than the second number of REGs.

8. The method of claim 1, wherein a control channel element (CCE) in the CORESET configuration includes a particular number of resource element groups (REGs), wherein a first number of REGs in ascending order in a first frequency range and a second number of REGs in ascending order in a second frequency range form the CCE, and wherein each REG of the first number of REGs is within a same OFDM symbol in the time domain as a corresponding REG of the second number of REGs.

9. The method of claim 8, wherein the CORESET configuration allocates a multiple of three OFDM symbols to the CORESET.

10. The method of claim 1, wherein the second message indicates a resource allocation for a physical downlink shared channel (PDSCH), and wherein a starting symbol of the PDSCH comprises one of a fourth OFDM symbol to a twelfth OFDM symbol of a slot allocated to the PDSCH by the resource allocation.

11. The method of claim 1, wherein the CORESET configuration corresponds to reduced bandwidth devices, and wherein the first message further defines a second CORESET configuration for non-reduced bandwidth devices.

12. An apparatus for wireless communication, the apparatus comprising:
   at least one processor; and
   a memory coupled to the at least one processor, wherein the at least one processor is configured to:
      receive, from a base station, a first message that indicates a control resource set (CORESET) configuration, the CORESET configuration corresponding to communications with the base station via a bandwidth part (BWP) that is less than 5 megahertz (MHz), the CORESET configuration allocating between 4 and 14 orthogonal frequency division multiplexing (OFDM) symbols in the time domain to a CORESET;

monitor a set of time and frequency resources to receive a second message from the base station, the set of time and frequency resources having the CORESET configuration;

monitor for a demodulation reference signal (DMRS) at a first OFDM symbol that is subsequent to a last OFDM symbol allocated to the CORESET by the CORESET configuration; and monitor for an additional portion of the DMRS at a second OFDM symbol within a time slot that is allocated to a physical downlink shared channel (PDSCH) by a resource allocation for the PDSCH that is included in the second message.

13. The apparatus of claim 12, wherein:
the CORESET configuration allocates 14 OFDM symbols in the time domain and 24 physical resource blocks (PRBs) in the frequency domain to the CORESET for communications having a subcarrier spacing (SCS) of 15 kilohertz (KHz); or the CORESET configuration allocates 14 OFDM symbols in the time domain and 12 physical resource blocks (PRBs) in the frequency domain to the CORESET for communications having a subcarrier spacing (SCS) of 30 kilohertz (KHz).

14. The apparatus of claim 12, wherein the second message indicates a resource allocation for a physical downlink shared channel (PDSCH), wherein the CORESET configuration allocates one or more physical resource blocks (PRBs) within a first time slot and a first frequency range, wherein the first time slot is included in the resource allocation for the PDSCH, and wherein the first frequency range is different than a second frequency range included in the resource allocation for the PDSCH.

15. The apparatus of claim 12, wherein a control channel element (CCE) in the CORESET configuration includes a particular number of resource element groups (REG), wherein a first number of REGs in ascending order in a first frequency range and a second number of REGs in descending order in a second frequency range form the CCE, and wherein at least some of the first REGs and the second REGs overlap in the time domain.

16. The apparatus of claim 15, wherein the first number of REGs is different than the second number of REGs.

17. A method of wireless communication, the method comprising:
generating, at a base station, a first message that indicates a control resource set (CORESET) configuration, the CORESET configuration corresponding to communications between a user equipment (UE) and the base station via a bandwidth part (BWP) that is less than 5 megahertz (MHz), the CORESET configuration allocating between 4 and 14 orthogonal frequency division multiplexing (OFDM) symbols in the time domain to a CORESET;

transmitting, to the UE, the first message; and transmitting, to the UE, a second message via a set of time and frequency resources having the CORESET configuration, the second message indicating a resource allocation for a physical downlink shared channel (PDSCH).

18. The method of claim 17, wherein the CORESET configuration allocates:
one or more physical resource blocks (PRBs) within a first time slot and a first frequency range, wherein the first time slot is different than any time slot included in the resource allocation for the PDSCH, and wherein the first frequency range is different than a second frequency range included in the resource allocation for the PDSCH;

one or more PRBs within a first time slot and a first frequency range, wherein the first time slot is different than any time slot included in the resource allocation for the PDSCH, and wherein the first frequency range at least partially overlaps a second frequency range included in the resource allocation for the PDSCH;

one or more PRBs within a first time slot and a first frequency range, wherein the first time slot is included in the resource allocation for the PDSCH, and wherein the first frequency range is different than a second frequency range included in the resource allocation for the PDSCH; or one or more PRBs within a first time slot and a first frequency range, wherein the first time slot is included in the resource allocation for the PDSCH, and wherein the first frequency range at least partially overlaps, a second frequency range included in the resource allocation for the PDSCH.

19. The method of claim 17, wherein a control channel element (CCE) in the CORESET configuration includes a particular number of resource element groups (REGs), wherein a first number of REGs in ascending order in a first frequency range and a second number of REGs in descending order in a second frequency range form the CCE, and wherein at least some of the first REGs and the second REGs overlap in the time domain.

20. The method of claim 17, wherein a control channel element (CCE) in the CORESET configuration includes a particular number of resource element groups (REGs), wherein a first number of REGs in ascending order in a first frequency range and a second number of REGs in ascending order in a second frequency range form the CCE, and wherein each REG of the first number of REGs is within a same OFDM symbol in the time domain as a corresponding REG of the second number of REGs.

21. An apparatus for wireless communication, the apparatus comprising:
at least one processor; and
a memory coupled to the at least one processor, wherein the at least one processor is configured to:
generate a first message that indicates a control resource set (CORESET) configuration, the CORESET configuration corresponding to communications with a user equipment (UE) via a bandwidth part (BWP) that is less than 5 megahertz (MHz), the CORESET configuration allocating between 4 and 14 orthogonal frequency division multiplexing (OFDM) symbols in the time domain to a CORESET;
initiate transmission, to the UE, of the first message; and
wherein the at least one processor is further configured to initiate transmission, to the UE, of a demodulation reference signal (DMRS) at a first OFDM symbol that is subsequent to a last OFDM symbol allocated to the CORESET by the CORESET configuration.

22. The apparatus of claim 21, wherein the at least one processor is further configured to:
initiate transmission, to the UE, of a second message via a set of time and frequency resources having the CORESET configuration, the second message indicating a resource allocation for a physical downlink shared channel (PDSCH); and initiate transmission, to the UE, of an additional portion of the DMRS at a second OFDM symbol within a time slot that is allocated to the PDSCH.

\* \* \* \* \*